United States Patent
Discolo et al.

(10) Patent No.: US 6,370,566 B2
(45) Date of Patent: *Apr. 9, 2002

(54) GENERATING MEETING REQUESTS AND GROUP SCHEDULING FROM A MOBILE DEVICE

(75) Inventors: Anthony Discolo, Redmond; Scott Skorupa, Newcastle; Salim Alam, Redmond; Garrett R. Vargas, Kirkland; Dave Whitney, Bellevue; Bryce Ulrich, Kirkland; John I. Ferrell, Bellevue, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,679

(22) Filed: Apr. 10, 1998

(51) Int. Cl.⁷ .............................................. G06F 15/16
(52) U.S. Cl. ........................ 709/206; 709/201; 709/203
(58) Field of Search .............................. 709/106, 206, 709/201, 227, 216, 10, 203

(56) References Cited

U.S. PATENT DOCUMENTS

| | | | | |
|---|---|---|---|---|
| 5,392,390 A | | 2/1995 | Crozier ........................ 395/161 |
| 5,630,081 A | | 5/1997 | Rybicki et al. ............. 395/348 |
| 5,664,228 A | | 9/1997 | Mital ........................ 395/882 |
| 5,666,530 A | * | 9/1997 | Clark et al. ................. 707/201 |
| 5,684,990 A | | 11/1997 | Boothby ..................... 395/619 |
| 5,701,423 A | | 12/1997 | Crozier ....................... 395/335 |
| 5,729,687 A | * | 3/1998 | Rothrock et al. ........... 709/205 |
| 5,758,354 A | * | 5/1998 | Huang et al. ............... 709/106 |
| 5,805,830 A | * | 9/1998 | Reese et al. ................ 709/205 |
| 5,832,489 A | * | 11/1998 | Kucala ........................ 707/10 |
| 5,856,978 A | * | 1/1999 | Anthias et al. ............. 370/429 |
| 5,884,323 A | | 3/1999 | Hawkins et al. ............ 707/201 |
| 5,928,329 A | * | 7/1999 | Clark et al. ................. 709/227 |
| 5,960,406 A | * | 9/1999 | Rasansky et al. ........... 707/500 |
| 5,961,590 A | * | 10/1999 | Mendez et al. ............. 709/206 |
| 6,016,478 A | * | 1/2000 | Zhang et al. ............... 709/206 |
| 6,018,761 A | * | 1/2000 | Uomini ....................... 709/206 |
| 6,034,621 A | * | 3/2000 | Kaufman .................... 370/310 |

OTHER PUBLICATIONS

O'Connor et al., "Managing Contacts in Windows 95", PC User, Apr. 1996.*
Microsoft Office 97/Visual Basic Programmer's Guide, Chapter 5 Microsoft Outlook Objects. Last updated Feb. 3, 1997.
The Microsoft Outlook 97 Automation Server Programming Model, Published Mar. 3, 1997 by Randy Byrne.

(List continued on next page.)

*Primary Examiner*—Ayaz Sheikh
*Assistant Examiner*—Philip B. Tran
(74) *Attorney, Agent, or Firm*—Joseph R. Kelly; Westman, Champlin & Kelly, P.A.

(57) ABSTRACT

The present invention includes a mobile device which provides the user with the ability to schedule a meeting request from the mobile device itself. The mobile device creates an object representative of the meeting request and assigns the object a global identification number which uniquely identifies the object to other devices which encounter the object. In addition, the mobile device in accordance with one aspect of the present invention provides a property in the object which is indicative of whether the meeting request has already been transmitted. In this way, other devices which encounter the meeting request are capable of identifying it as a unique meeting request, and of determining whether the meeting request has already been transmitted, in order to alleviate the problem of duplicate meeting request transmissions.

23 Claims, 8 Drawing Sheets

OTHER PUBLICATIONS

RecurringEvent Object. 1998 Microsoft Corporation.
RecurrencePattern Object. 1998 Microsoft Corporation.
AppointmentItem Object. 1998 Microsoft Corporation.
"Method for Personal Digital Assistance Calendar Export Nomenclature" for *IBM® Technical Disclosure Bulletin*, vol. 37 No. 3, Mar. 1994.

"The CallManager system: A platform for intelligent telecommunications services", by David J. Pepper, Sharad Singhal and Scott Soper, for *Speech Communication*, vol. 23, 1997.

* cited by examiner

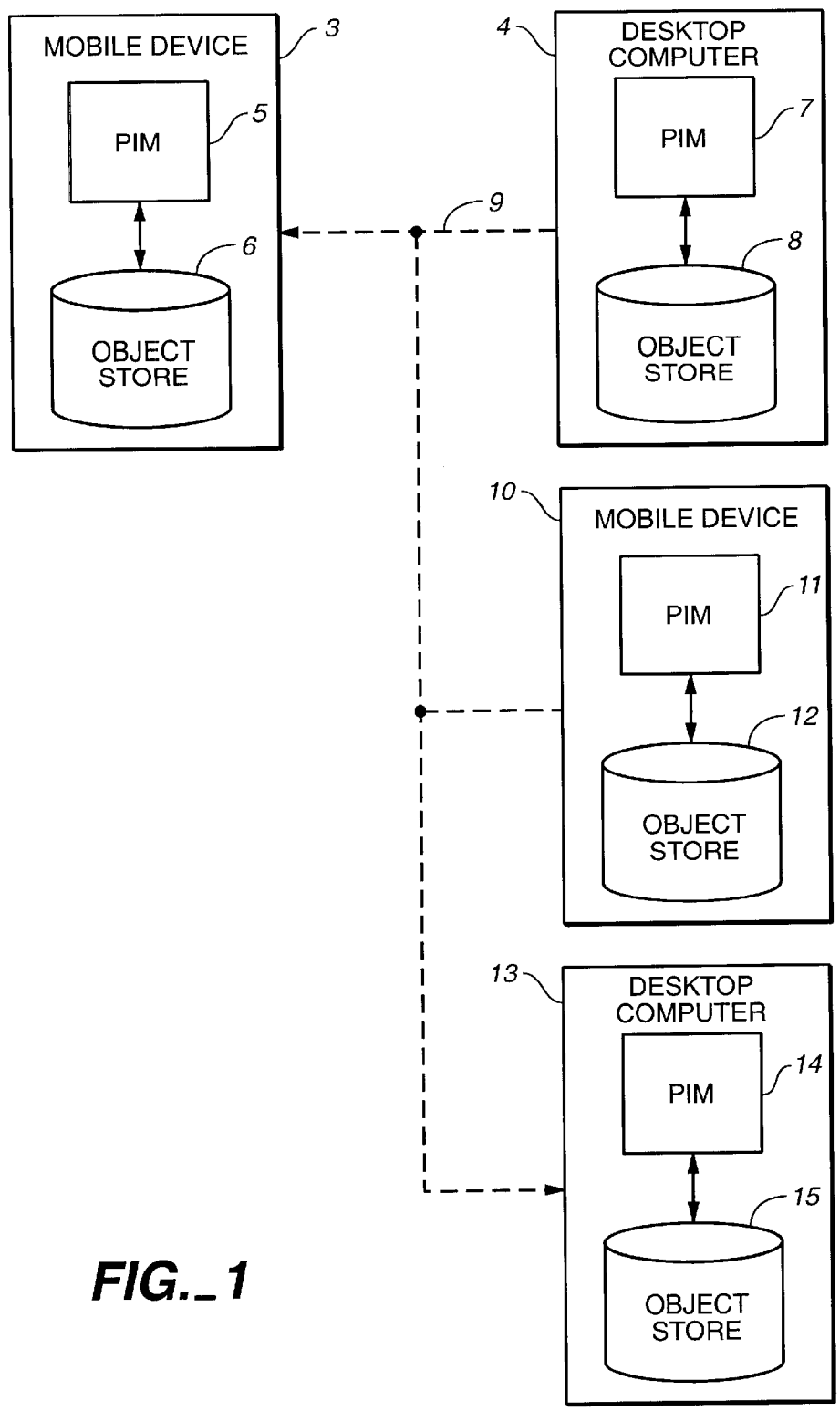
FIG._1

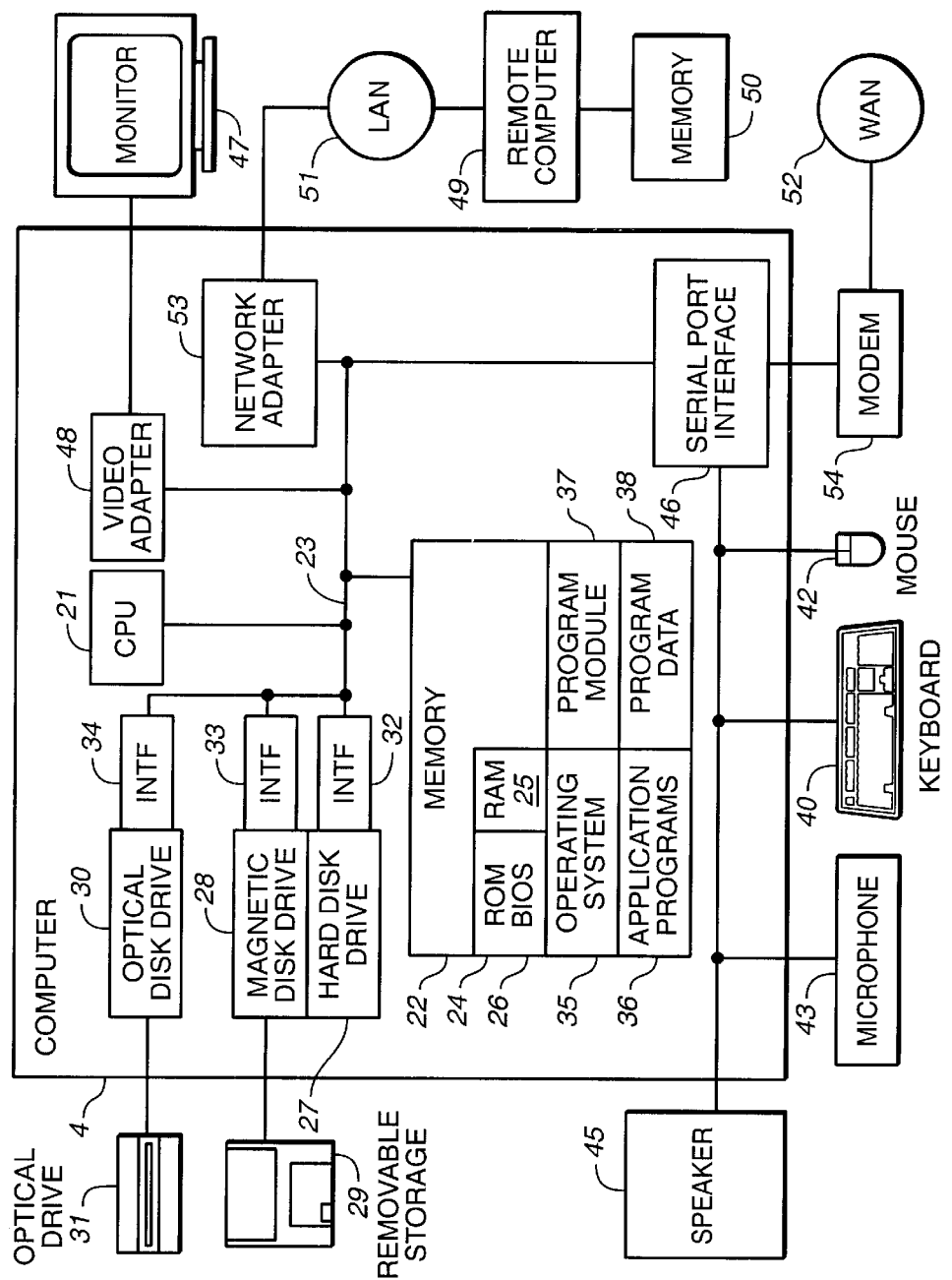
FIG._2

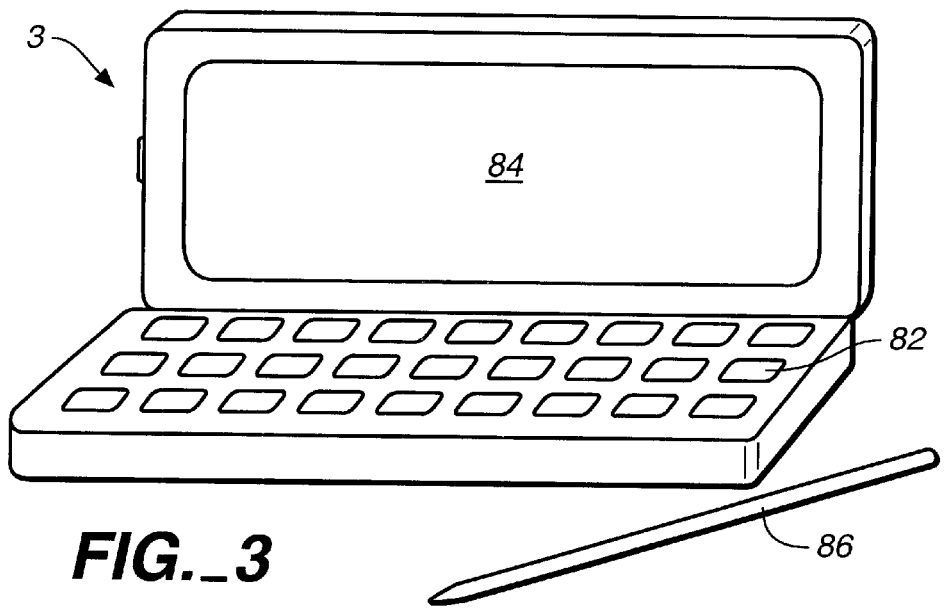
FIG._3
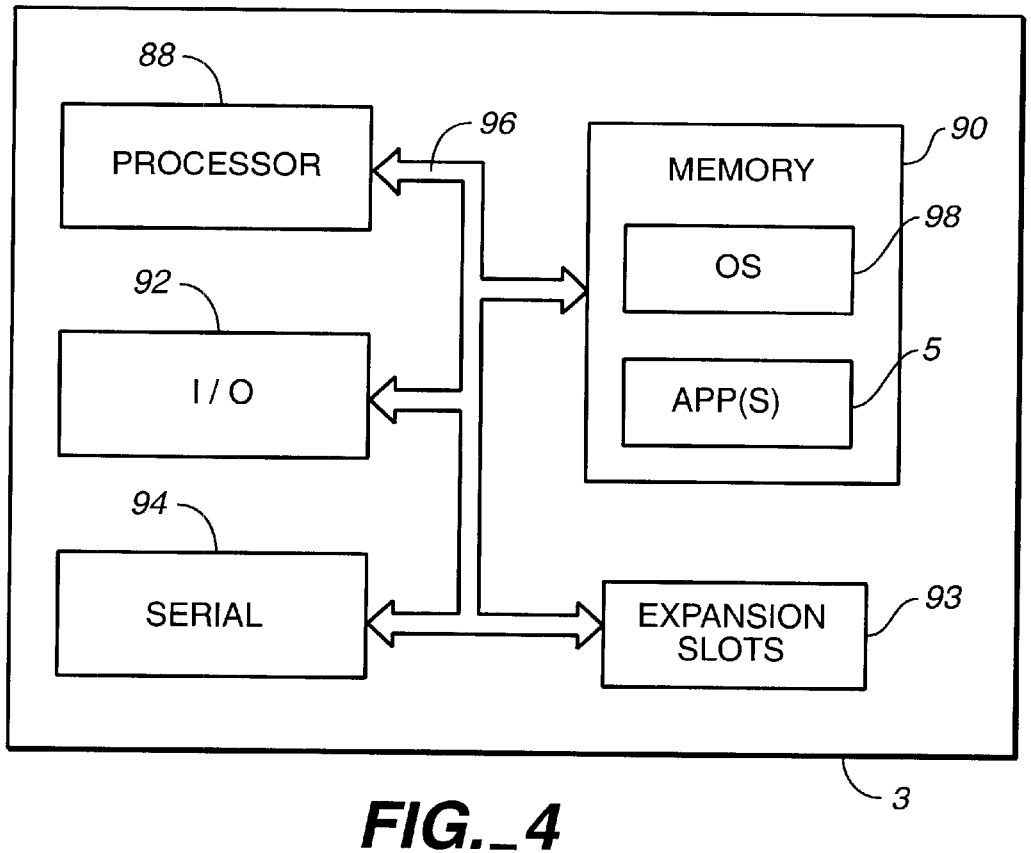
FIG._4

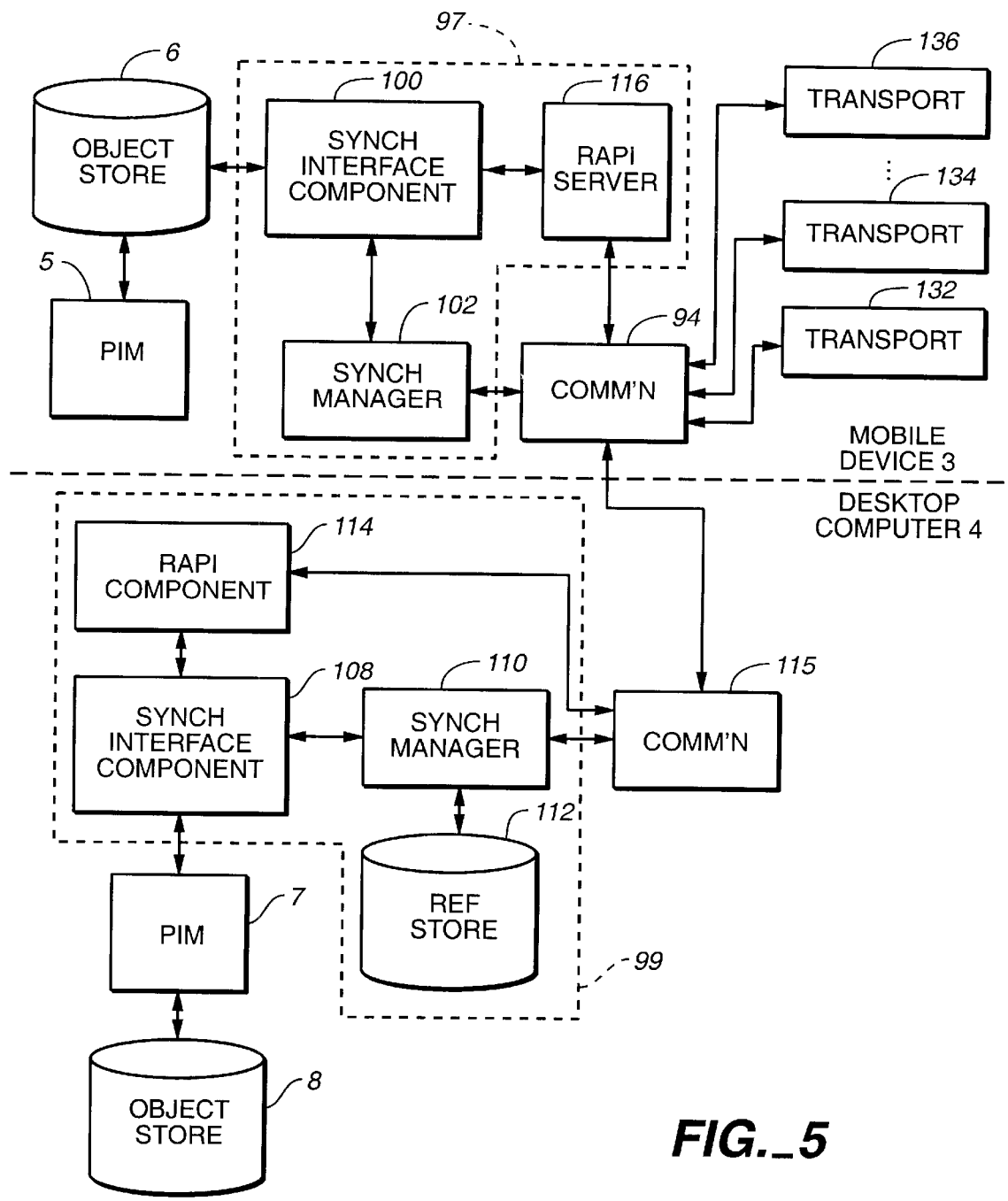
FIG._5

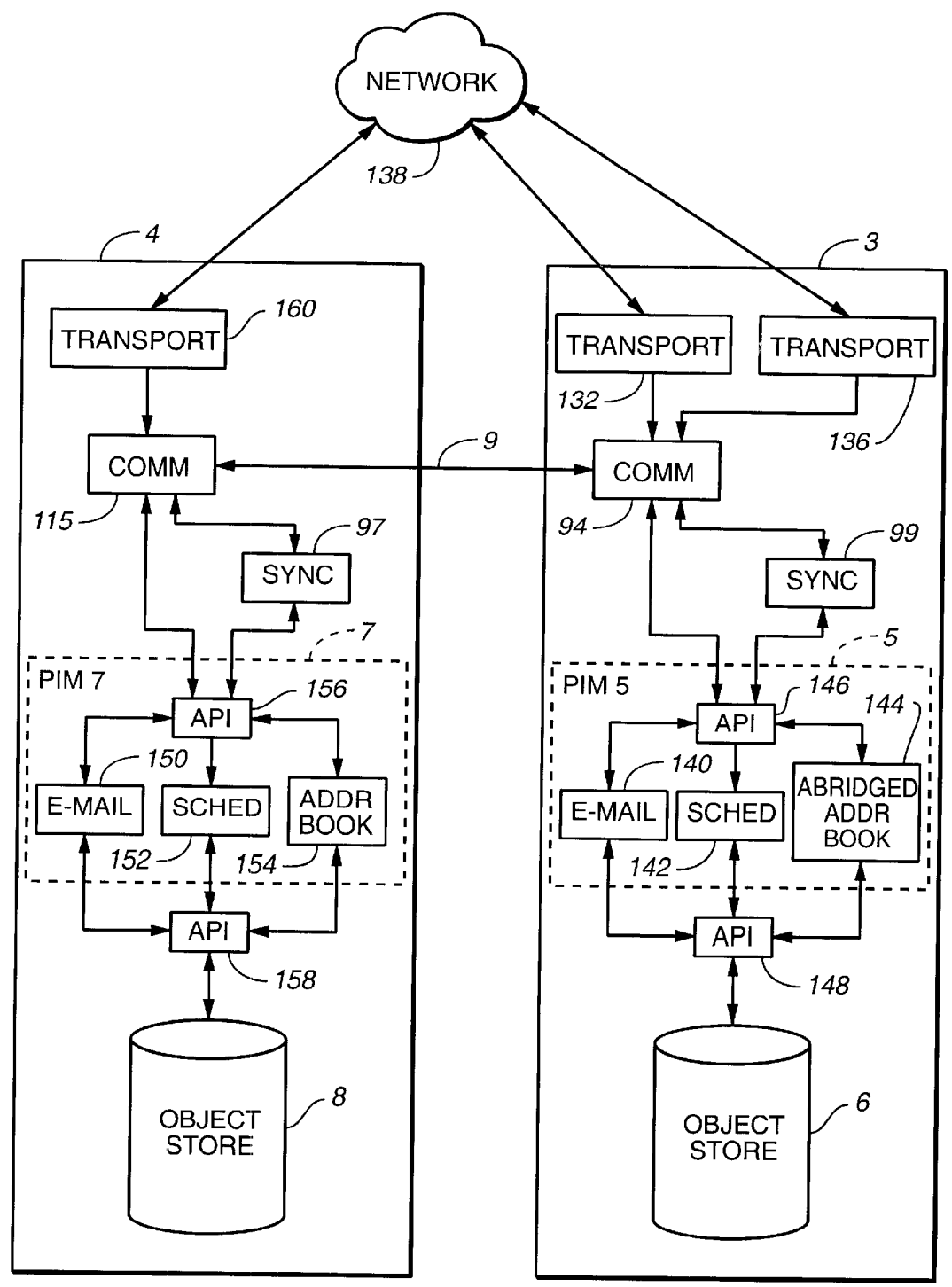
FIG._6

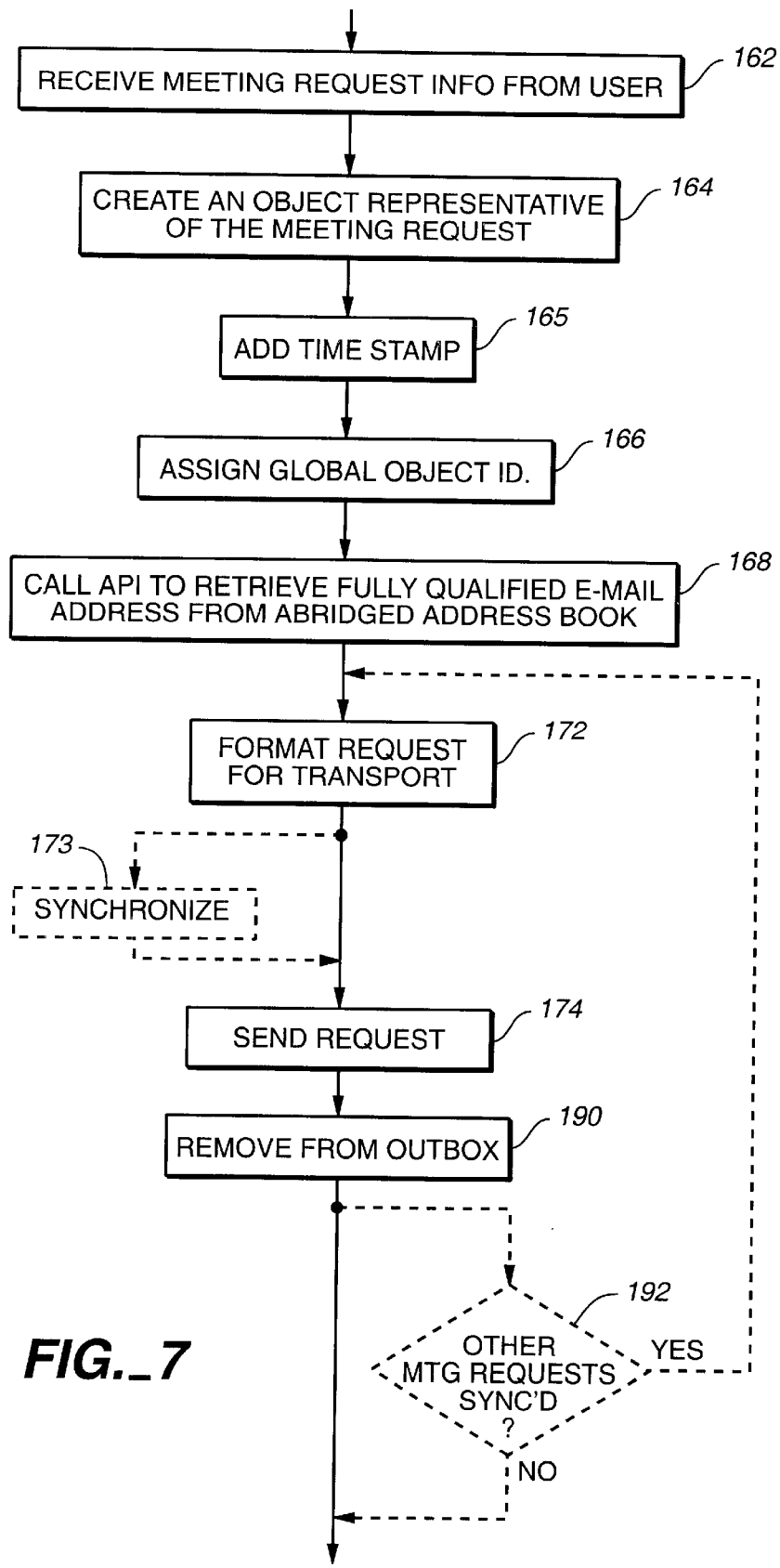
FIG._7

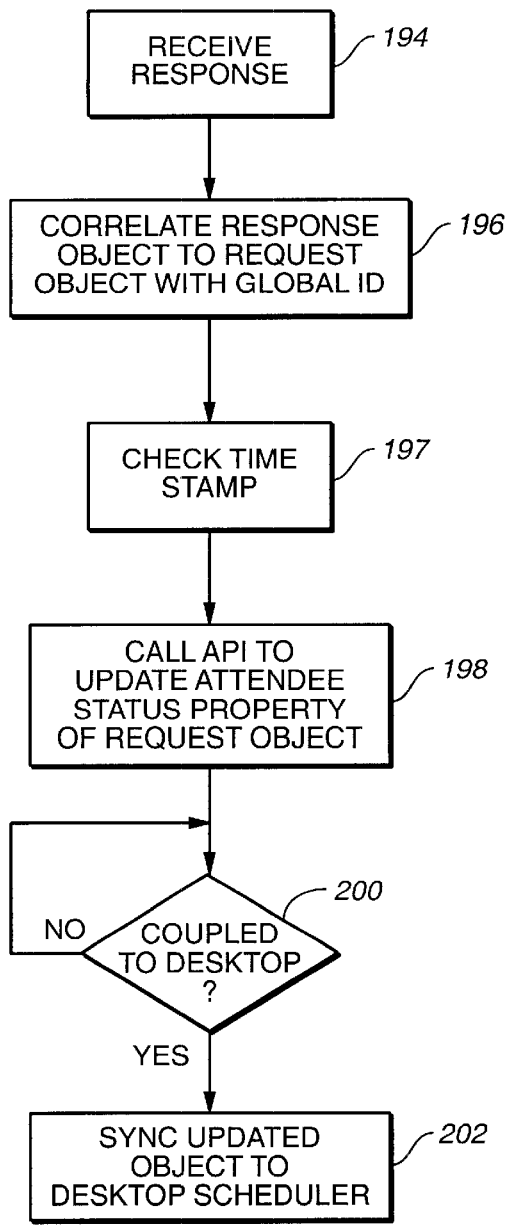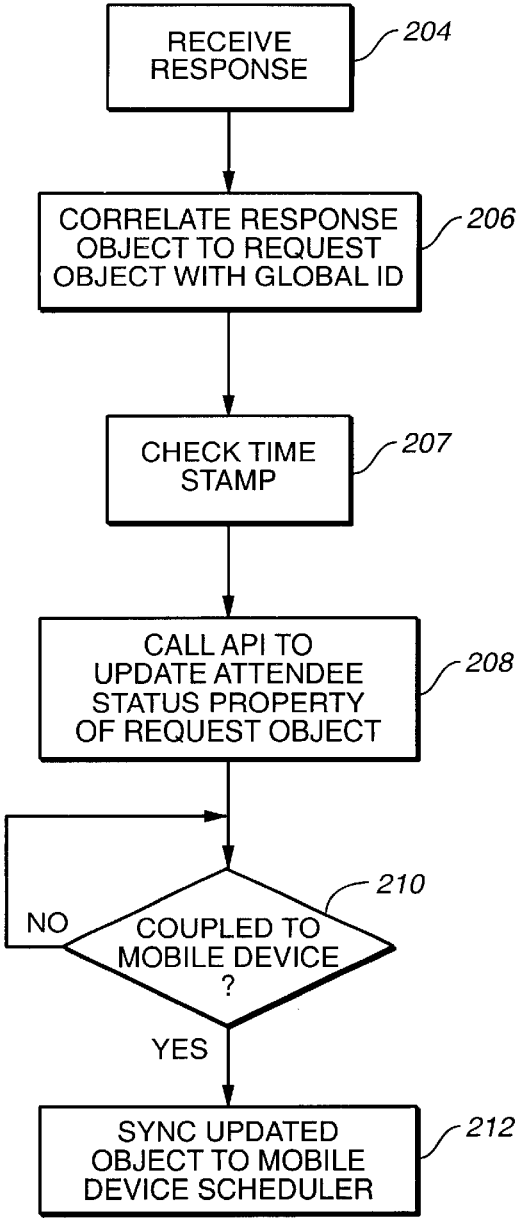
FIG._8  FIG._9

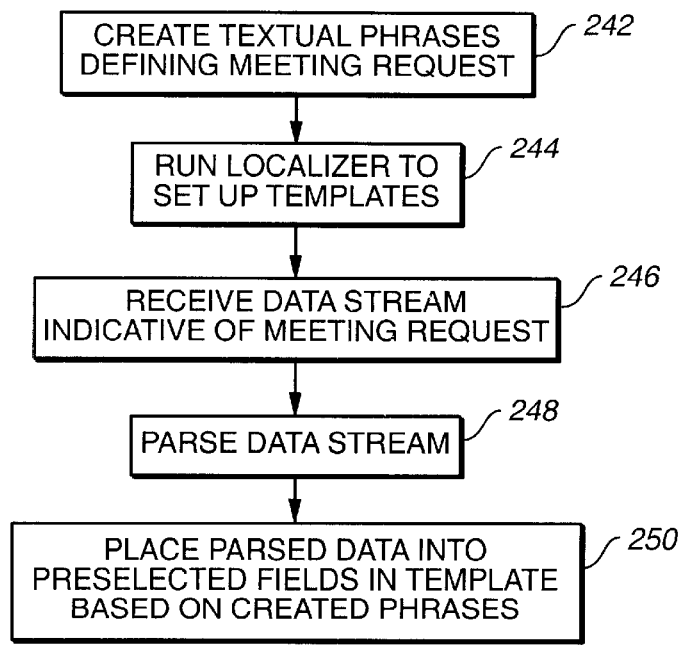
FIG._10
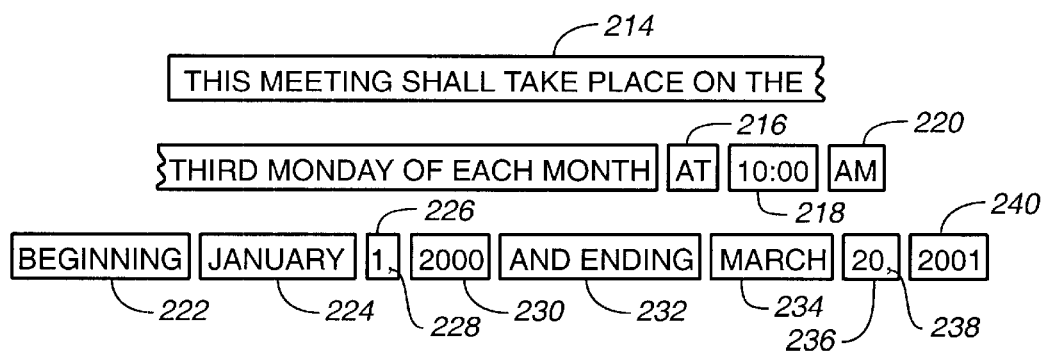
FIG._11A
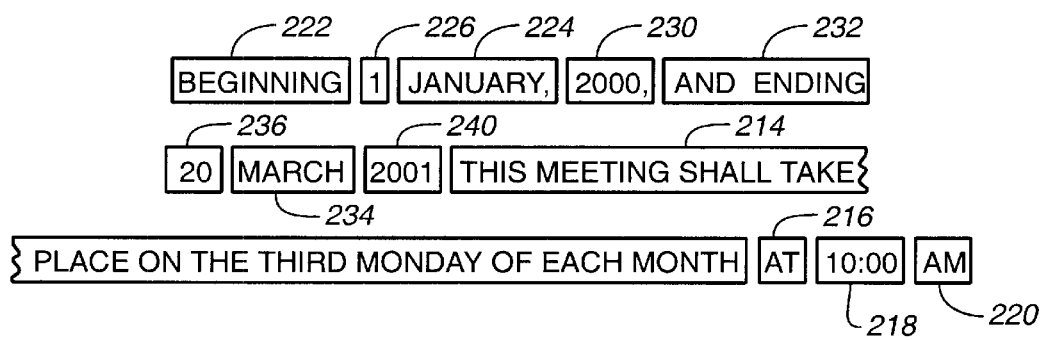
FIG._11B

GENERATING MEETING REQUESTS AND GROUP SCHEDULING FROM A MOBILE DEVICE

REFERENCE TO CO-PENDING PATENT APPLICATION

This patent application claims the priority of the following two U.S. provisional patent applications, Ser. No. 60/063,164 entitled "FEATURES OF A MOBILE DEVICE AND ASSOCIATED COMPUTER", filed on Oct. 24, 1997 and Ser. No. 60/064,986 entitled "FEATURES OF A MOBILE DEVICE AND ASSOCIATED COMPUTER", filed on Nov. 7, 1997.

Reference is hereby made to the following co-pending U.S. patent applications which are hereby incorporated by reference:

Ser. No. 09/058,613, filed on even date herewith, entitled "ELECTRONIC MAIL OBJECT SYNCHRONIZATION BETWEEN A DESKTOP COMPUTER AND MOBILE DEVICE"; and Ser. No. 09/058,528, filed on even date herewith, entitled "SYSTEM AND METHOD FOR INTERACTION BETWEEN A DESKTOP COMPUTER AND MULTIPLE MOBILE DEVICE", all of which are assigned to same assignee as the present invention.

BACKGROUND OF THE INVENTION

Mobile devices are small electronic computing devices often referred to as personal digital assistants. One such mobile device is sold under the trade name Handheld PC (or "H/PC") based on a Windows CE brand operating system provided by Microsoft Corporation of Redmond, Wash. While a wide variety of computing tasks and applications can be performed by such mobile devices, personal information managers (PIMs) are particularly well suited to mobile devices.

PIMs typically comprise applications which enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the brand names Microsoft Schedule+ and Microsoft Outlook and are commercially available from Microsoft Corporation of Redmond, Wash. For purposes of this discussion, PIMs shall also include separate electronic mail applications, such as that available under the brand name Microsoft Exchange.

It is also common for mobile devices to be used in conjunction with a desktop computer. For example, the user of a mobile device may also have access to, and use, a desktop computer at work, at home, or both. A user may typically run the same types of PIMs on both the desktop computer and the mobile device (although the particular versions of the PIMs may be somewhat different from the desktop computer to the mobile device). Thus, it is quite advantageous for the mobile device to be designed to be couplable to the desktop computer to exchange information with, and share information with, the desktop computer.

The user may also typically make changes to the PIMs both on the mobile device, and at the desktop. Therefore, it is advantageous for the PIMs on both the mobile device and the desktop to contain the most up-to-date information, regardless of whether recent changes to the PIMs have been made on the mobile device or the desktop computer. The process of coupling the mobile device with the desktop computer, and integrating the information stored by the PIMs on the mobile device and the desktop computer such that the two contain the same updated information is referred to as synchronization.

Conventional PIMs which support electronic calendaring and scheduling features (collectively referred to as a scheduler, or as a scheduling application) are traditionally supported on desktop computers. Such PIMs provide the ability of the user to schedule a meeting request for one or more desired attendees.

In order to generate a meeting request, the user typically interacts with the scheduling application through a user interface. The user interface provides the user with a plurality of selectable options to parameterize the meeting request. For example, the user interface typically allows the user to pick a date and time (and often a place) on which the meeting is to be held. The user interface also typically allows the user to select a group of attendees that the user wishes to attend the meeting, to enter some textual description of the meeting, and to specify whether the meeting is for only a single date, or is a recurring meeting (i.e., whether the meeting is to occur only on one date, the $15^{th}$ of every month, the first Monday of every month, every Monday, etc.).

Based on this information, the scheduling application creates an object which is representative of the meeting and enters it on the user's calendar as an appointment. Such objects are typically defined by a number of properties, some of which are defined by the user input information which the user provides while generating the meeting request. The meeting object also contains a critical time stamp (UTC) which is updated whenever a critical change is made to the meeting object, such as changes to the start or end date or time, changes in the location, etc.

Since other people are identified as attendees, the appointment entered on the calendar is viewed as a meeting and the scheduling application typically calls methods exposed by an electronic mail application in accordance with messaging application programming interfaces (MAPI), or other APIs which are a set of well documented, published interfaces commercially available from the Microsoft Corporation of Redmond, Wash.

In response, the electronic mail application creates another object (an electronic mail meeting request object) indicative of the meeting request and the electronic mail application (or suitable transport) formats this electronic mail meeting request object into a well defined electronic mail message suitable for transmission. In doing so, the critical time stamp from the meeting object is also placed in the electronic mail meeting request object. The electronic mail application then interacts with a specified transport and transports the electronic mail meeting request object to a network which routes it to the designated attendees. In doing so, the electronic mail application typically accesses an address book stored in a database to obtain the fully qualified electronic mail address for the attendees. This is also typically done by calling MAPI or other suitable API methods associated with the database storing the address book. The generation of the meeting object and the creation of the electronic mail meeting request object will be referred to herein collectively as creating a meeting request.

The potential attendees then typically respond to the meeting request. In doing so, the originator's critical time stamp is sent back (unmodified) along with the response. The response also includes a recipient critical time stamp and an indication of the recipient's response (e.g., accept, decline, tentative, etc.). The recipient critical time stamp is updated by the recipient (potential attendee) whenever a critical change is made by the recipient. This allows the user to reliably order receipt of multiple versions of the same meeting (e.g., where the originator changes the time, date or location of the meeting such that multiple meeting requests are generated). It also allows the originator to reliably order receipt of responses and ensure that each response correlates to the most recent version of the meeting.

The response is then transmitted back to the originator (e.g., the sending computer). The electronic mail application and scheduling application on the originator then typically process the response (or responses) accordingly. For example, the originator stores, for each recipient (or potential attendee) the recipient critical time stamp in a table along with each recipient's response code (which is indicative of the accept, decline, tentative response). The two commercially available PIMs identified above (the Microsoft Schedule+ and Microsoft Outlook brand PIMs) are examples of PIMs which support the features discussed above.

Meeting cancellations, and exceptions to recurring meeting must also be handled. For example, the PIMs may allow scheduled meetings to be cancelled, and allow a variety of exceptions to a recurring meeting pattern.

Scheduling of meeting requests as described above has, to date, only been supported by desktop computers or laptop computers which are fitted with a hard disk drive or other high capacity memory mechanisms, or by low intelligence terminals which are permanently attached to a server or other similar computer which, itself, contains a high capacity storage device. The ability to schedule a meeting request from a mobile device is simply unavailable. While some current mobile devices are provided with PIMs that allow the user to view meeting requests, and to view meetings which have already been scheduled, current mobile devices do not allow the user to generate a meeting request from the mobile device itself.

A number of significant obstacles present themselves when attempting to provide the user with the capability of generating a meeting request from a mobile device. Meeting cancellations and exceptions to recurring meetings must be handled. Also, a significant problem arises with respect to the possibility of transmitting duplicate meeting requests. While duplicate meeting requests as described below may not necessarily be created with all PIMs, they do present a potential problem which must be considered. For example, if the user of the mobile device were able to generate a meeting request, a meeting object would first be entered on the calendar of the mobile device. The electronic mail application on the mobile device would then create a corresponding electronic mail meeting request object. The next time the mobile device was synchronized with the desktop computer, the meeting object would be synchronized with the calendar object store on the desktop computer and the electronic mail meeting request object would be synchronized to the desktop outbox. The desktop computer, would recognize the electronic mail meeting request object in its outbox, format it for transmission, and transmit it over the network. Further, synchronizing the meeting object to the calendar of the desktop computer may result in another electronic mail meeting request object being created and transmitted by the desktop computer. This would result in duplicate electronic mail meeting request objects being created (one by the mobile device, and one by the desktop computer after synchronization) and transmitted. Under that scenario, potential attendees would receive two or more meeting requests, and may respond to both. This would create duplicate responses to what was intended to be a single meeting request.

A similar problem may occur if a meeting request were generated in a conventional manner (on a desktop computer) for instance, and was then synchronized to a mobile device having the capability of generating and transmitting meeting requests. The meeting object on the desktop calendar would be synchronized to the calendar of the mobile device. The mobile device might then recognize the meeting object synchronized from the desktop, and create an electronic mail meeting request object and attempt to transmit the object. This would result in substantially the same problem—duplicate meeting requests and duplicate responses for what was intended to be a single meeting request.

Further, if the user of the mobile device coupled the mobile device for synchronization with more than one desktop computer (e.g., a home computer and work computer, if the mobile device were provided with this capability) the same problem would result. In that instance, and using conventional architecture, both desktop computers would synchronize with, and recognize, the meeting object and the electronic mail meeting request object from the mobile device. The desktop computers would both potentially create additional electronic mail meeting request objects and transmit them to the potential attendees. Again, this would result in many different meeting requests and responses being transmitted for what was intended to be only a single meeting request.

In addition, if mobile devices were provided with the capability of being connected directly to one another, and communicating with one another, without going through a desktop or similar computer, the meeting request could be generated by one mobile device, responded to by another mobile device, and scheduled on both mobile devices. However, the next time the first mobile device is synchronized with the desktop computer, that computer might again recognize the meeting object synchronized from the calendar of the mobile device, create another electronic mail meeting request object and transmit the electronic mail meeting request object. Thus, a significant problem potentially exists with respect to the generation of multiple meeting requests.

Of course, similar problems also result from critical changes to the meeting object on either the desktop computer or the mobile device. This will cause unwanted duplicate electronic mail meeting requests in a similar fashion.

Additional problems also present themselves simply by the fact that conventional mobile devices have a memory capacity which is significantly less than that of a desktop computer or similar computer. Thus, problems arise with respect to storing address books on the mobile device itself which contain the fully qualified electronic mail address of all potential attendees.

Further obstacles present themselves because many desktop computers on which the meeting request must be processed have different scheduling applications. Therefore, the meeting request generated by the mobile device may be incompatible with scheduling applications which it encounters.

In addition, localization of meeting requests can present a problem. For instance, in some localities, it is conventional, when writing a date, to place the month first, the day second and the year third. In other localities, other orders are conventional. Further, a textual description which describes the meeting and which accompanies the meeting request, may need to be rearranged to conform to local convention. Also, meeting requests can be generated in one time zone and transmitted to recipients in other time zones. This can tend to be confusing.

The present invention addresses some or all of these obstacles.

SUMMARY OF THE INVENTION

The present invention includes a mobile device which provides the user with the ability to schedule a meeting request from the mobile device itself. The mobile device creates an object representative of the meeting request and assigns the object a global identification number which uniquely identifies the object to other devices which encounter the object. In this way, other devices which encounter the meeting request are capable of identifying it as a unique meeting request in order to alleviate the problem of duplicate meeting request transmissions.

In accordance with another preferred feature of the present invention, an electronic mail application or calendar application on the mobile device obtains a fully qualified electronic mail address for the potential attendees from an abridged address book or directory stored on the mobile device itself. This alleviates problems associated with the storage capacity of the mobile device.

In accordance with another preferred embodiment of the present invention, the mobile device creates the meeting object and the electronic mail meeting request object using a set of properties which are supported by a plurality of PIMs that may receive the objects. This provides compatibility with an increased number of devices which are likely to encounter the objects.

In accordance with yet another preferred feature of the present invention, localizers implement a plurality of templates on the mobile device which are used in formatting the properties of the objects associated with the meeting request. A data stream representative of the meeting request is parsed by the mobile device and placed in pre-defined fields in the appropriate templates so that the text viewed by the user of the mobile device more closely conforms to local convention. In addition, time zone information is also included in one embodiment.

BRIEF DESCRIPTION OF THE DRAWINGS

FIG. 1 is a block diagram illustrating a basic environment of the present invention.

FIG. 2 is a block diagram of one embodiment of a conventional desktop computer used in conjunction with a mobile device in accordance with the present invention.

FIG. 3 is a simplified pictorial illustration of one embodiment of a mobile device in accordance with the present invention.

FIG. 4 is a simplified block diagram of one embodiment of the mobile device shown in FIG. 3.

FIG. 5 is an architectural block diagram illustrating one embodiment of portions of the desktop computer shown in FIG. 2 and the mobile device shown in FIGS. 3 and 4 to illustrate synchronization of information stored in object stores on the desktop computer and the mobile device in accordance with the present invention.

FIG. 6 is an architectural block diagram illustrating one embodiment of portions of the desktop computer shown in FIG. 2 and the mobile device shown in FIGS. 3 and 4 to illustrate the generation and transmission of a meeting request.

FIG. 7 is a flow diagram illustrating the generation of a meeting request in accordance with one preferred embodiment of the present invention.

FIG. 8 is a flow diagram illustrating the handling of responses to a meeting request on the mobile device shown in FIGS. 3 and 4 in accordance with one preferred embodiment of the present invention.

FIG. 9 is a flow diagram illustrating the handling of responses to a meeting request on the desktop computer shown in FIG. 2 in accordance with one preferred embodiment of the present invention.

FIG. 10 is a flow diagram illustrating the use of a localizer to localize the textual description of a meeting request in accordance with one preferred embodiment of the present invention.

FIGS. 11A and 11B illustrate one embodiment of a template used to localize the textual description of a meeting request in accordance with the present invention.

DETAILED DESCRIPTION OF THE PREFERRED EMBODIMENTS

OVERVIEW

FIG. 1 is a block diagram of a typical system or environment 2 in which the present invention operates. Environment 2 includes mobile device 3 and desktop computer 4. FIG. 1 also illustrates that mobile device 3 can optionally be separately coupled to another mobile device 10 or another desktop computer 13.

Mobile device 3 includes an application program 5 and an object store 6. Desktop computer 4 also includes an application program 7 and an object store 8. Mobile device 10 includes an application program 11 and object store 12. Further, desktop computer 13 includes an application program 14 and an object store 15.

Mobile device 3 is couplable to desktop computer 4, mobile device 10 or desktop computer 13 by one of a plurality of connection mechanisms 9. The operation of desktop computers 4 and 13 and the operation of mobile devices 3 and 10 are preferably similar. Therefore, for the sake of simplicity, the present description proceeds only with respect to mobile device 3 and desktop computer 4.

In one preferred embodiment of the present invention, application program 7 on desktop 4 is a personal information manager (PIM) which supports electronic mail messaging, scheduling and calendaring and an address book containing contact information.

PIM applications are not always integrated. For instance, some scheduling programs do not contain electronic mail features, but interface with whatever electronic mail program is provided, and vice versa. Of course, PIM 7 (whether it be a single application, a single integrated application or multiple interfaced applications) can be configured to support a wide variety of other features, such as task lists and personalized address books, to name a few. However, for the sake of clarity, only features relating to electronic mail messaging, scheduling and calendar features, and address book features are discussed in detail with respect to the present invention.

Object store 8 is a memory which is configured to store a plurality of individual records or objects, each comprising a plurality of fields or properties related to the above-mentioned features. In one preferred embodiment, PIM 7 is a program, such as that available under the commercial designation Microsoft Outlook 97, and object store 8 is configured to store objects, each of which has a plurality of properties which can be associated with electronic mail messaging, scheduling and calendaring, and contact information.

For example, some properties included in an object associated with electronic mail messaging include the sender's name, the recipient's name, text messages, an indication of whether attachments are attached to any given electronic mail message, and possibly other similar properties. Also, some properties associated with scheduling and calendaring include critical time stamp information, date and time information, potential attendees, recurrence properties which describe recurrent meetings or meeting requests, and a textual description of the meeting request. Some properties associated with contact information include the proper names, or familiar names, of those in the contact list, the addresses and telephone numbers of those listed, and the fully qualified electronic mail address for those in the list. Any number of other properties can also be included. Desktop computer 4 executes the application program identified as PIM 7 to maintain objects stored in object store 8.

The application program designated as PIM 5 for mobile device 3 is a similar PIM to that stored on desktop computer 4. Object store 6 on mobile device 3 is configured to store a plurality of individual records or objects, each comprising a plurality of fields or properties related to the abovementioned, supported features. As with PIM 7, PIM 5 can also support a wide variety of other features. However, for the sake of clarity, only those features related to the present invention are discussed in detail herein.

In one illustrative embodiment, each object in object store 6 comprises the same set of properties stored in object store 8 for related messages, or a subset of those properties. In addition, the objects stored in object store 6 also preferably include a critical change time stamp, properties which indicate whether potential attendees identified in a meeting request have responded, and a global identification of each individual meeting request (discussed in greater detail below). Mobile device 3 executes PIM 5 to maintain the objects in object store 6.

In the illustrative embodiment, each object stored in object store 8 is also stored in object store 6. However, there are actually two instances of each object (one in object store 6 and one in object store 8). Thus, when a user changes one instance of the object stored in either store 6 or store 8, the second instance of that object in the other of stores 6 and 8 is preferably updated the next time mobile device 3 is connected to desktop computer 4 so that both instances of the same object contain up-to-date data. This is referred to as synchronization.

In order to accomplish synchronization, synchronization components run on both mobile device 3 and desktop computer 4. The synchronization components communicate with PIMs 5 and 7 on mobile device 3 and desktop computer 4 through well defined interfaces to manage communication and synchronization.

The components of mobile device 3 and desktop computer 4 communicate with each other through any suitable, and commercially available, communication link 9, and using a suitable communications protocol. For instance, in one preferred embodiment, mobile device 3 is connectable to desktop computer 4 with a physical cable which communicates using a serial communications protocol. Other communication mechanisms are also contemplated by the present invention, such as infrared (IR) communication, direct modem communication, remote dial-up networking communication, communication through commercially available network cards (i.e., using TCP/IP), remote access services (RAS), wireless modem, wireless cellular digital packet data (CDPD), or other suitable communication mechanisms.

FIG. 2 and the related discussion are intended to provide a brief, general description of a suitable desktop computer 4 in which portions of the invention may be implemented. Although not required, the invention will be described, at least in part, in the general context of computer-executable instructions, such as program modules, being executed by a personal computer 4 or mobile device 3. Generally, program modules include routine programs, objects, components, data structures, etc. that perform particular tasks or implement particular abstract data types. Moreover, those skilled in the art will appreciate that desktop computer 4 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. Examples of distributed programs include those available under the commercial designations Exchange, Schedule+ and MS Mail, all available from Microsoft Corporation.

With reference to FIG. 2, an exemplary system for implementing desktop computer 4 includes a general purpose computing device in the form of a conventional personal computer 4, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routine that helps to transfer information between elements within the desktop computer 4, such as during start-up, is stored in EEPROM which is part of ROM 24. The desktop computer 4 further preferably includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the desktop computer 4.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36 (which include PIMs 7), other program modules 37, and program data 38. A user may enter commands and information into the desktop computer 4 through input devices such as a keyboard 40, pointing device 42 and microphone 62. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, desktop computers may typically include other peripheral output devices such as speaker 45 and printers.

The desktop computer 4 may operate in a networked environment using logic connections to one or more remote computers (other than mobile device 3), such as a remote computer 49. The remote computer 49 may be another personal computer, a server, a router, a network PC, a peer device or other network node, and typically includes many or all of the elements described above relative to desktop computer 4, although only a memory storage device 50 has been illustrated in FIG. 2. The logic connections depicted in FIG. 2 include a local area network (LAN) 51 and a wide area network (WAN) 52. Such networking environments are commonplace in offices, enterprise-wide computer network intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to desktop computer 4, or portions thereof, may be stored in the remote memory storage devices. It will be appreciated that the network connections shown are exemplary and other means of establishing a communications link between the computers may be used.

Desktop computer 4 runs operating system 35 that is typically stored in non-volatile memory 24 and executes on the processor 21. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. PIM 7 is preferably stored in program module 37, in volatile memory or non-volatile memory, or can be loaded into any of the components shown in FIG. 2 from a floppy diskette 29, CDROM drive 31, downloaded from a network via network adapter 53, or loaded using another suitable mechanism.

A dynamically linked library (DLL), comprising a plurality of executable functions is associated with PIM 7 for execution by processor 21. Interprocessor and intercomponent calls are facilitated using the component object model (COM) as is common in programs written for Microsoft Windows brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLL associated with PIM 7 is designed specifically to work in conjunction with PIM 7 and to expose desktop synchronization interfaces that function as described in more detail in the above-referenced co-pending U.S. patent application according to a synchronization protocol. The DLL, in turn, calls interfaces exposed by PIM 7 in order to access data representing individual properties of objects maintained in object store 8. Object store 8, of course, can reside in any one of the suitable memory components described with respect to FIG. 2.

FIG. 3 is a pictorial illustration of one preferred embodiment of a mobile device 3 which can be used in accordance with the present invention. Mobile device 3, in one preferred embodiment, is a desktop assistant sold under the designation H/PC and being based on, for example, the Windows CE brand operating system provided by Microsoft Corporation. In one preferred embodiment, mobile device 3 is housed in a housing which fits comfortably in the hand of a typical user. Mobile device 3 has some components which are similar to those of desktop computer 4. For instance, in one preferred embodiment, mobile device 3 includes a miniaturized keyboard 82, display 84, and stylus 86. Of course, other configurations, such as without keyboards, can also be used.

In the embodiment shown in FIG. 3, display 84 is a liquid crystal display (LCD) which uses a contact-sensitive display screen in conjunction with stylus 86. Stylus 86 is used to press or contact the display 84 at designated coordinates to accomplish certain user input functions. Of course, other user input configurations can be used as well. For example, user input mechanisms could be included such as a keypad, a track ball, and other various types of miniaturized keyboards, or the like. In addition, mobile device 3 may not be embodied as the H/PC brand of digital assistant, but could also be implemented as another type of personal digital assistant (PDA), another personal organizer, a palm top computer, or a similar computerized notepad device.

FIG. 4 is a more detailed block diagram of mobile device 3. Mobile device 3 preferably includes microprocessor 88, memory 90, input/output (I/O) components 92 (which include keyboard 82 and touch sensitive screen 84), optional expansion slots 93 (which can be used for plugging in such things as PC cards, compact flash memory, etc.) and serial interface 94. In the illustrative embodiment, these components of mobile device 3 are coupled for communication with one another over a suitable bus 96.

In the illustrative embodiment, memory 90 is implemented as non-volatile electronic memory such as a random access memory (RAM) with a battery back-up module (not shown) such that information stored in memory 90 is not lost when the general power to mobile device 30 is shut down. A portion of memory 90 is preferably allocated as addressable memory for program execution, while another portion of memory 90 is preferably used to simulate storage on a disk drive.

Memory 90 includes operating system 98 and application (or PIM) 5. Operating system 98, during operation, is preferably loaded into, and executed by, processor 88 from memory 90. Operating system 98, in one preferred embodiment, is the Windows CE brand operating system. The operating system 98 is preferably designed for mobile devices, and implements database features which can be utilized by PIM 5 through a set of exposed application programming interfaces and methods. The objects in object store 6 are preferably maintained by PIM 5 and operating system 98, at least partially in response to calls to the exposed application program interfaces and methods.

It should be noted that PIM 5 is not necessarily designed to be entirely compatible with PIM 7 which executes on desktop computer 4. For instance, there may not be a precise one-to-one matching between the properties of specific object types. Some properties supported by the electronic mail messaging features of PIM 5 may have no corresponding features in PIM 7 on desktop computer 4, and vise versa.

OBJECT SYNCHRONIZATION

While object synchronization is described in greater detail in the above-referenced co-pending patent applications, it is described here, briefly, to assist in understanding the present invention.

FIG. 5 is an architectural block diagram illustrating one preferred embodiment of architectural components of mobile device 3 and desktop computer 4 which are used in synchronizing objects stored in object store 6 on mobile device 3 and object store 8 on desktop computer 4. It should be noted that the synchronization architecture illustrated in FIG. 5 is but one preferred embodiment and others could be used as well. Further, the synchronization operation can be carried out between any two coupled stores (such as those on any combination of pairs of computers 4 and 13, and mobile devices 3 and 10). All that is required is a synchronization manager component, as described below, which directs synchronization of the two coupled stores. The synchronization manager can reside on either device, or both, or on a third computer coupled to the two stores. However, for the sake of simplicity, only the embodiment in which desktop computer 4 is coupled to mobile device 3 is described herein. Also, the present synchronization protocol is but one preferred embodiment, as another suitable. protocol could be implemented on top of standard electronic mail protocols.

In addition to PIM 5 and object store 6, mobile device 3 includes synchronization module 97 which, in turn, includes interface component 100, and synchronization manager 102. Mobile device 3 also includes communications component 94, remote application programming interface (RAPI) server 116, and electronic mail messaging transports 132, 134 and 136.

Desktop computer 4 includes, in addition to PIM 7 and object store 8, synchronization module 99 which, in turn, includes interface component 108, synchronization manager 110, reference store 112, and RAPI component 114. Desktop computer 4 also includes communications component 115.

Generally, in the embodiment illustrated in FIG. 5, synchronization manager 110 executes on desktop computer 4 and orchestrates synchronization between objects in object store 6 in handheld device 3, and objects in object store 8 in desktop computer 4. Synchronization manager 110 also maintains reference store 112 apart from desktop object store 8 as is described in greater detail below. Synchronization manager 110 implements the synchronization protocol to allow a comparison between corresponding objects stored in object store 6 in mobile device 3 and object store 8 in desktop computer 4, to receive objects from object store 8, and to update objects in object store 8. The synchronization protocol also facilitates the retrieval of objects stored in object store 6 in mobile device 3 through synchronization interface component 100 and synchronization manager 102, as well as communications component 94.

On the side of mobile device 3, the synchronization interface component 100 exposes application programming interfaces which synchronization manager 102 calls to read and store objects and object properties on object store 6. In general, the application programming interfaces allow the creation of databases for different types of objects, and allow application programs to write and read property names and values to and from respective objects within object store 6.

As discussed with respect to FIG. 1, PIM 5 executes on mobile device 3 and maintains object store 6. PIM 7 executes on desktop computer 4 and maintains object store 8. There are many different ways which PIMs 5 and 7 can store objects in object stores 6 and 8. However, in a preferred embodiment PIMs 5 and 7 create a distinct database for each object type. For example, different databases are created for meetings, contacts, tasks, electronic mail messages, etc. A predefined set of properties is supported for each object type, and each of the databases is assigned a name by the application program that creates it.

In an alternative embodiment, the application programs in PIMs 5 and 7 may use a single database for all object types, with the first property of each object defining the type of object. In any case, objects are uniquely identified within mobile device 3 and desktop computer 4 by object identifiers which are independent of the names assigned by the application programs creating the object.

Synchronization manager 110 is not necessarily closely associated with PIM 7. Rather, it is an independent component which synchronizes objects from any application program that supports the appropriate desktop synchronization interfaces. The specific synchronization interfaces are described in greater detail in the co-pending patent application incorporated above. Communication components 94 and 115 implement serial communications between the computers using suitable link 9.

Synchronization manager 110 communicates with PIM 7 and accesses object store 8 through synchronization interface component 108. Synchronization interface component 108 corresponds generally to a DLL discussed with respect to FIG. 2 above, and exposes one or more application program interfaces and methods.

The interfaces and methods are described in greater detail in the co-pending patent application which is incorporated above by reference. Of these interfaces, one of note is preferably of the form known as messaging application program interfaces (MAPI) developed and published by the Microsoft Corporation for Windows brand operating system platforms, but other suitable interfaces can be used as well. In one preferred embodiment, the MAPI exposed by component 108 is a C-language application programming interface which allows programmable access to features of an electronic mail messaging program known as MS Mail also commercially available from the Microsoft Corporation. In another preferred embodiment, the MAPI exposed by component 108 is a component object model based (COM-based) set of interfaces which is sometimes referred to as extended MAPI and includes a set of automation interfaces to messaging systems, for use in Visual Basic and the like. However, synchronization interface component 108 and the associated application program interfaces and methods can be any suitable synchronization interface components designed for any particular application in PIM 7. Because the application program interfaces are preferably standardized, they allow synchronization manager 110 to access and synchronize any number of different desktop PIMs, as long as the required interface methods are implemented for each PIM.

Reference store 112 provides a mapping between instances of objects stored in object store 6 on mobile device 3 and objects stored in object store 8 on desktop computer 4. Since the same object identifiers are not used by PIM 5 to identify objects on object store 6 as are used by PIM 7 to identify objects in object store 8, this mapping is required.

Synchronization manager 110 maintains reference store 112 so that reference store 112 contains the identifying data segments corresponding respectively to a plurality of object instances in object store 8 on desktop computer 4 that are to be synchronized with instances of the same object in object store 6 on mobile device 3. The identifying data segments are updated each time corresponding object instances have been synchronized.

The exact composition of an identifying data segment which is used to identify the particular object instances are assignable by the developer of the desktop synchronization interface component 108, and are then handled and stored by synchronization manager 110. The identifying data segments preferably include some sort of time stamp information which can be compared to determine whether an object has changed since the identifying data segment was last recorded in reference store 112.

In addition to maintaining a plurality of identifying data segments, synchronization manager 110 also maintains a list of object identifiers corresponding to objects maintained in object store 6. These identifiers are provided to synchronization manager 110 whenever a new object is added to object store 6 on mobile device 3.

SYNCHRONIZATION PROTOCOL

The exact protocol by which full synchronization is accomplished in accordance with one embodiment of the present system is described in greater detail in the above referenced patent application. However, a brief discussion of that protocol is helpful in understanding of the present invention. In order to synchronize objects, synchronization manager 110 first creates two lists of handles which refer to particular objects. The term "handle" refers to a number or other identifier that can be used to uniquely identify an object and to access the object. Generally, a handle is valid for a particular time period or session; such as during the time when an object has been "opened." If the same object is opened again, its handle may be different.

The first list of handles is obtained from reference store 112 and is indicative of objects which have been synchronized in the past and are identified in reference store 112. The second list of handles is a list which identifies the objects stored on object store 8. The two lists of handles are compared against one another to determine whether the same objects are stored in reference store 112 and object store 8.

If an object is identified in reference store 112, but not in object store 8, that particular object has been deleted from the desktop 4 since the last synchronization. On the other hand, if an object is identified in object store 8, but it does not appear in reference store 112, then it has been added to the desktop since the last synchronization. In either case, synchronization manager 110 determines how to handle the object. In one preferred embodiment, those objects which have been deleted from desktop object store 8 are also deleted from reference store 112. Further, those which have been added to object store 8 are also added to reference store 112.

Synchronization manager 110 then determines whether any of the objects stored in object store 8 have been modified at the desktop since the last synchronization. In other words, if handles corresponding to the same object appear in both object store 8 and reference store 112, but they are not identical (such as the time stamp, a revision number, or another suitable identifying segment is not the same) that indicates that the object in object store 8 has been modified since the last synchronization.

Synchronization manager 110 then determines whether any objects stored in object store 6 on mobile device 3 have been added or modified since the last synchronization. To determine whether an object has been added to object store 6, synchronization manager 110 compares the list of objects in reference store 112 (which reflects all objects at the last synchronization) with a list of objects on object store 6 maintained by synchronization manager 102. To determine whether an existing object has been modified, synchronization manager 102 is configured to maintain a status bit associated with each object stored in object store 6. The status bit reflects whether the particular object associated with that bit has been changed since the last synchronization. If so, synchronization manager 102 notifies synchronization manager 110 of that change if device 3 is then coupled to desktop computer 4, or simply logs the status bit and sends it to synchronization manager 110 the next time device 3 is coupled to desktop computer 4.

It should be noted that none of these procedures require either synchronization manager 110 or synchronization manager 102 to be aware of the particular nature or format of the identifying data segments or of the objects to which they correspond. Rather, interface components 100 and 108 are called upon for all actions that depend upon the actual content of the identifying data segments, and the content of the objects. It is up to the designer of those interfaces to define a format for the identifying data segments that allows the interfaces to perform their required functions.

Once the changes, additions and deletions are determined by synchronization manager 110, the items are synchronized. In order to do this, synchronization manager 110 forms a list of objects which have been changed on either object store 8 or object store 6 and simply calls upon the respective synchronization interface components to update the outdated object. If the same object has been modified both on mobile device 3 and desktop computer 4, a conflict arises. Synchronization manager 110 resolves the conflicts by either prompting the user, or referencing profile information entered by the user during a set-up procedure which dictates which device the user wants to take precedence over the other, and in which instances. The process of setting up profile information is described in greater detail in the above-identification patent applications.

Where an object has either been created at the desktop computer 4 or in the mobile device 3, that object needs to be exchanged with the other device. In the instance where mobile device 3 needs to obtain a new object from desktop computer 4, synchronization manager 110 calls an interface method known as "Set-Up" which specifies a handle for the object to be obtained from object store 8 in desktop computer 4 and transferred to object store 6 in mobile device 3. Once the handle is obtained, the method known as "Get-Packet" is called repeatedly to retrieve a data stream which represents the object, and which is formatted by interface component 108. Synchronization manager 110 simply treats the data as a data stream which is retrieved and sent over link 9 to synchronization manager 102, and eventually to object store 6. The appropriate synchronization interface component 100 parses the data stream in order to identify certain property values associated with properties corresponding to the object. Those properties are then stored in the object store 6.

Finally, synchronization manager 110 updates the identifying data segments associated with either synchronized or exchanged objects and stores the updated data segments in reference store 112.

It is worth noting that the architecture described herein provides synchronization of objects associated with electronic mail messages, meetings or appointments, and contacts information, as well as other objects maintained by PIMs 5 and 7. Thus, using the above synchronization protocol, objects associated with these features are synchronized during the synchronization process. Synchronization manager 110 detects any new objects in object store 8 which represent new electronic mail messages, meetings or appointments or contact information and causes those objects to be transferred to object store 6 on mobile device 3 for attention by the user of mobile device 3.

Further, if the user composes an electronic mail message or schedules a meeting (and therefore creates a meeting object and an electronic mail meeting request object) or enters contact information on mobile device 3 using an appropriate application in PIM 5, the objects associated with those items are stored as new objects in object store 6. During synchronization, those new objects are transferred to desktop computer 4 and object store 8.

MEETING REQUESTS

FIG. 6 is an architectural block diagram illustrating one preferred embodiment of a mechanism by which meeting requests are generated. Mobile device 3 and desktop computer 4 are shown coupled to one another, as shown in FIG. S. However, FIG. 6 also illustrates that mobile device 3 and desktop computer 4 can be coupled to a wide area network 138 which can include simply another mobile device, another desktop S computer, LAN 51 (shown in FIG. 2), WAN 52 (shown in FIG. 2), or any other suitable network.

Similar items to those shown in FIG. 5 are similarly numbered. However, in FIG. 6, PIMs 5 and 7 are shown in greater detail. FIG. 6 illustrates that, in one preferred embodiment, PIM 5 includes an electronic mail application 140, a calendar and scheduling application 142, and an abridged address book 144. Also, while each of the applications may have designated application programming interfaces, only a single API component 146 is shown in FIG. 6, for the sake of simplicity.

FIG. 6 further illustrates that object store 6 preferably interfaces with applications 140, 142 and 144 through its own set of application programming interfaces 148. Thus, applications 140, 142 and 144 maintain object store 6 by calling methods exposed by application programming interfaces 148 associated with object store 6. In addition, communication component 94 and sync component 99 communicate with application programs 140, 142 and 144 by calling methods exposed by application programming interfaces 146.

PIM 7 in desktop computer 4 has also been illustrated as a more detail block diagram. In one preferred embodiment, PIM 7 includes electronic mail application program 150, scheduling and calendaring program 152 and full address book program 154. While each of the application programs 150, 152 and 154 may have an associated set of application programming interfaces, only a single application programming interface component 156 is illustrated in FIG. 6, for the sake of simplicity.

FIG. 6 further illustrates that, in one preferred embodiment, object store 8 is associated with its own set of application programming interfaces 158 (which may also be the same as API 156, preferably MAPI, or which may be separate therefrom). Thus, application programs 150, 152 and 154 call methods exposed by application programming interfaces 158 to maintain, and interact with, object store 8. In addition, communications component 115 calls methods exposed by application programming interfaces 156 to interact with application programs 150, 152 and 154.

FIG. 6 shows that desktop computer 4 preferably includes electronic mail transport 160. Electronic mail transport 160 is preferably a commercially available electronic mail transport, such as a SMTP transport. However, it should be noted that desktop computer 4 can include any suitable transport, or combination of transports.

FIG. 7 is a flow diagram illustrating the creation of a meeting request on mobile device 3. The following description will proceed with reference to FIGS. 6 and 7.

In order to create a meeting request from mobile device 3, the user first enters meeting request information through a suitable user interface. In one preferred embodiment, the user opens the scheduling application program 142 which causes a suitable user interface to be displayed on screen 84. Using stylus 86, and possibly keypad 82 (or any other suitable input mechanism), the user enters appropriate information to request a meeting. Such information will typically include the date and time of the meeting, the requested attendees (which may be entered by using a fully qualified electronic mail address, or by entering a familiar name, or selected from entries in a contacts database which have a non-empty electronic mail address field), the subject matter of the meeting, an indication of whether the meeting is recurring or a single event, possibly the location of the meeting, and so on. Scheduling application 142 creates an object representative of the meeting request.

This information is used to create a meeting object and enter that object in the store associated with the calendar on mobile device 3. As a result of the creation of the meeting object, an electronic mail meeting request object is also created. It should also be noted that subsequent critical modifications to the meeting object will also cause updated electronic mail meeting request objects to be created and transmitted as well.

In a preferred embodiment, a selection has already been made which specifies a transport by which any electronic mail meeting request objects are to be sent. Alternatively, the transport to be used can be implicit in the full electronic mail address, itself. For example, it can be specified that any of transports 132–136 are to be used, when mobile device 3 is to transmit the meeting request itself. In addition, a selection has also preferably already been made to specify certain options which are to be used in the sync protocol discussed above. For example, if an inbox synchronization option is enabled, the electronic mail meeting request objects will be synchronized to the outbox of desktop computer 4. Also, if a calendar synchronization option is enabled, the meeting object will be synchronized to the calendar of desktop computer 4. Desktop computer 4 then preferably transmits the electronic mail meeting request object synchronized to its outbox.

The receipt of the meeting request information from the user, and the creation of a meeting object representative of the meeting and an electronic mail meeting request object are indicated by blocks 162 and 164 in FIG. 7.

Next, the critical time stamp is added to the objects (as indicated by block 165) and scheduling application 142 assigns a global object identification tag to the meeting object created. The global object identification tag is a tag, such as a number, which uniquely identifies the object representative of the meeting request to mobile device 3, to desktop computer 4, and to all other devices which may encounter that object. The global identification tag is carried with the electronic mail meeting request object when it is transmitted, and remains with the object on other devices. This is indicated by block 166.

Because the electronic mail meeting request object must be transmitted to another device, scheduling application 142 calls methods in API 146 which manipulate electronic mail program 140 to retrieve a fully qualified electronic mail address for all of the potential attendees who are to receive the meeting request. In one preferred embodiment, scheduling application 142 obtains the fully qualified address directly from an address book. In another embodiment, mobile device 3 includes abridged address book program 144. In a preferred embodiment, abridged address book program 144 is implemented as a contacts feature provided by Microsoft Outlook 97. The abridged address book contains proper names, familiar names, addresses, telephone numbers, and fully qualified electronic mail addresses for people that the user has chosen to add to the abridged address book. Those people will likely be people who receive a significant number of electronic mail messages from the user of mobile device 3. Therefore, that information likely contains the fully qualified electronic mail addresses for the potential attendees of the meeting request. In addition, if the address is not fully qualified, the synchronization component 97 on desktop 4 attempts to resolve the name on the desktop prior to sending the electronic mail transmission.

Thus, either electronic mail application 140 or scheduling application 142 call methods in API 146 which cause abridged address book program 144 to retrieve the fully qualified electronic mail address for the familiar names entered by the user as potential attendees. This significantly alleviates memory overhead which would otherwise be required, for instance, if the user was required to download a full address book from desktop computer 4 in order to send an electronic mail message or a meeting request. This is indicated by block 168. In another preferred embodiment, the functionality associated with block 168 is performed at block 162, as soon as the user inputs the appropriate information.

Also, the transport option has preferably already been chosen which indicates the particular transport by which the electronic mail messages are to be transmitted. Those transports can be any of transports 132–136 on mobile device 3 or through synchronization with desktop computer 4, using one of its transports. Based on the option which has been chosen, the electronic mail meeting request object is transmitted through the appropriate transport and, once transmitted, is removed from the outbox of mobile device 3.

If the electronic mail meeting request object is to be sent directly from one of the transports on mobile device 3, the appropriate transport formats the meeting request for transmission. In a preferred embodiment, the particular properties which scheduling application program 142 attributes to an electronic mail meeting request object representative of a meeting request are compatible with multiple other PIMs. Therefore, these properties may be a subset or a superset, of all of the properties recognized by the multiple PIMs such that the object can be entertained and appropriately handled by those PIMs. Appendix A, which is attached hereto and forms a part of this document, is a list of message properties by which the Microsoft Schedule+ brand scheduling program defines objects associated with meeting requests.

These properties notably include revised recurring notification properties which are backward compatible with other versions of Microsoft Schedule+ scheduling software. For instance, in the embodiment described in Appendix A, recurring notifications which are used to define recurring meetings are formatted as a superset of single-instance notifications. In this way, prior versions of the Microsoft Schedule+ scheduling software will be provided with well formed meeting notifications, even for recurring meetings.

In the preferred embodiment, scheduling program 142 then calls methods exposed by API 146 related to electronic mail application program 140. The electronic mail message which contains the electronic mail meeting request object is formulated into one of a predetermined number of classes by electronic mail application 140. The receiving scheduler program of the potential attendee differentiates between the type of meeting notification based on the mail message class. For example, in one preferred embodiment, mail message classifications exist for a meeting cancellation notice from the originator, a meeting request from the originator, a meeting acceptance from the attendee, a meeting declined from the attendee and a meeting tentatively accepted from the attendee. Thus, this is preferably included along with the object when the transport formats the electronic mail meeting request object for transmission. The meeting request is transmitted, through communications component 94 to the designated transport 132, 134 or 136 which, in turn, formats and transmits the message to network 138.

The formatting and transmission of the electronic mail meeting request object from a transport on mobile device 3 is indicated by blocks 172 and 174 in FIG. 7.

After the electronic mail meeting request object is sent, it is removed from the outbox of mobile device 3 to indicate that the message has been sent. This is indicated by block 190. Upon next being coupled to desktop computer 4, the meeting object is synchronized to the store containing the calendar on desktop computer 4. Preferably, the PIMs also provide a feature which can be utilized to prevent the PIM from creating and sending an electronic mail meeting request object simply because the meeting object has been synchronized to the calendar on the desktop. The feature may simply be to only create electronic mail meeting request objects for meeting requests created on the desktop. This feature is implemented to further address the problem of duplicate messaging.

If the transport option has been chosen to send the electronic mail meeting request object using the synchronization protocol and a mail transport on desktop computer 4, processing is substantially the same, except that the electronic mail meeting request object is synchronized to the outbox of desktop computer 4 (as indicated by block 173). Mobile device 3 simply waits until it is coupled to desktop computer 4 before any further action is taken with respect to that meeting request. Upon coupling of mobile device 3 to desktop computer 4, the synchronization protocol described above is executed. During the synchronization process, the meeting object is synchronized to the calendar on the desktop computer 4 and the electronic mail meeting request object is then synchronized to the outbox of desktop computer 4 through synchronization components 97 and 99. Upon receiving the electronic mail meeting request object indicative of the meeting request, electronic mail application program 150 recognizes that the meeting request needs to be transmitted. Electronic mail application program 150 calls the necessary methods exposed by API 158 to have the appropriate object transported, through communications component 115 and transport 160, to network 138. This is again indicated by blocks 172, 173, 174 and 190.

It is also worth noting that, in one alternatively preferred embodiment, the meeting request need not be entirely formatted on mobile device 3. Instead, the data representing the electronic mail meeting request object can simply be stored and transferred during synchronization to desktop computer 4 where it is fully formatted. For instance, in one preferred embodiment, mobile device 3 does not store the particular transport to be used by desktop computer 4 in sending the meeting request. Since this information is not stored by mobile device 3, it is not synchronized with desktop computer 4. Instead, electronic mail application program 150 on desktop computer 4 (prior to sending the meeting request) calls the necessary methods through API 156 to have full address book 154 retrieve the transport associated with each of the potential attendees identified by the user. That information is then used by electronic mail application program 150 in choosing the appropriate transport 160 with which to transmit the electronic mail meeting request object. In this way, additional memory capacity need not be consumed on mobile device 3 to store such transport information. This is indicated by block 188.

In any case, once electronic mail application program 150 causes the electronic mail meeting request object to be transmitted to network 138, it is removed from the outbox. This is indicated by block 190.

After the electronic mail meeting request object has been sent it is determined whether any other meeting requests were synchronized with desktop computer 4 during the last synchronization process. If not, normal processing continues. If so, processing reverts back to block 172 wherein electronic mail application program 150 calls the necessary APIs to send the object. This is indicated by block 192.

FIG. 8 is a flow diagram illustrating one preferred embodiment of how mobile device 3 handles responses to the meeting requests transmitted in accordance with FIG. 7. In the preferred embodiment, the addressee for responses to meeting requests is the meeting originator. Both senders and recipients of the meeting requests can be arranged properly for delegate handling. The publicly available MAPI specification fully discloses how to interpret such properties.

Thus, the recipient of the meeting request is provided with a suitable user interface to indicate a response. The response is addressed to the meeting originator, or another proper delegate. The response is then transferred by the device which the recipient is operating on and is received through one of transports 132, 134 or 136, or through communications component 94 on mobile device 3. This is indicated by block 194 in FIG. 8.

Upon receiving the response, scheduling application program 142 correlates the response to the meeting object which was formed by scheduling application program 142 when the user created the request, and which is stored in object store 6. This correlation is performed by using the unique global identification number which uniquely identifies that meeting request to all devices which may encounter it. This is indicated by block 196.

The critical time stamp information is then checked to determine whether the response corresponds to the latest meeting object. The response preferably actually contains two time stamps. The first is the recipient's opinion of the originator's critical time stamp. The second is a time stamp assigned by the recipient. The first is checked to determined whether it is the same as the originator's time stamp. If so, the response is considered to be in date. If not, the response is rejected or ignored as an out-of-date response. The second must be equal to or greater than any previously recorded time stamp from this particular recipient for the response to be in date. If not, the response is rejected or ignored as out-of-date. This is indicated by block 197.

It should be noted that in the preferred embodiment, the time stamps are always moving forward. Thus, even if the user resets the clock sufficiently into the past, any subsequent time stamp is always the later of a current clock time and the last time stamp plus one second.

Scheduling application program 142 then calls the necessary methods exposed by API 148 in order to update the attendee status associated with the request. This is updated based on the particular response received from the attendee. This is indicated by block 198.

Mobile device 3 then simply waits to be connected to desktop computer 4. Once it is connected, the updated objects (containing the updated attendee status property) are synchronized to the instance of that object stored in object store 8. This is accomplished utilizing the synchronization protocol discussed above. This is indicated by blocks 200 and 202. The meeting object is then available to scheduling application program 152 and desktop computer 4 to be displayed on the user's calendar at desktop computer 4 for user observation and interaction.

FIG. 9 is a flow diagram which illustrates one preferred embodiment of how responses are handled when received through transport 160 on desktop computer 4. The user first inputs information through an appropriate user interface which defines the user's response to the meeting request. The response is then transmitted back to desktop computer 4 through transport 160 and communications component 115. This is indicated by block 204.

Scheduling application program 152 correlates the response to the meeting object, as did mobile device 3, by utilizing the global identification number assigned to the meeting object, and received along with the response to the meeting request. This is indicated by block 206. The time stamp information is then checked to determine whether the response corresponds to the latest meeting object, again as described above. If not, the response is rejected or ignored as an out-of-date response. This is indicated by block 207. Scheduling application program 152 then calls the necessary methods exposed by API 158 to modify and update the attendee status of the meeting object stored in object store 8. This is indicated by block 208. Desktop computer 4 then simply waits until it is next coupled to mobile device 3.

At that point, the updated objects in object store 8 (which have been updated to accurately reflect the new attendee status based on the response) are synchronized to the other instance of that object then stored in object store 6. Synchronization is accomplished in accordance with the synchronization protocol discussed above. The updated object is then available for review and manipulation by the user of mobile device 3. This is indicated by blocks 210 and 212.

The mobile device in accordance with an illustrative embodiment of the present invention also handles exceptions to recurring meetings and meeting cancellations. In one embodiment, the scheduling PIM erases all exceptions when an update to the recurrence pattern of a recurrent meeting is received. Thus, new electronic mail objects must be created and sent for each exception once a change in the recurrent meeting pattern has been sent. For instance, assuming the user entered a recurring meeting request on mobile device 3. Scheduling application 142 creates a recurring meeting object and enters it on the calendar of the user. Electronic mail application 140 also creates an electronic mail recurring meeting request object for transmission to potential attendees. The recipients (potential attendees) can respond generally as described above.

For the sake of the present example, assume the recurring meeting is to occur every Tuesday from 10:00–11:00 a.m. beginning on April 1. However, the user (originator) then needs to cancel the April 8$^{th}$ meeting. The user enters scheduling application 142 and deletes the desired instance. Electronic mail application 140, in turn, creates another object for transmission which indicates this cancellation (which is an exception to the recurrence pattern). The originator then needs to move the April 15th meeting to 11:00–12:00 noon. A similar process is executed to create this exception as well. Suppose then that the originator wishes to make a change to the location of the recurring meetings and apply the change to the entire recurrence pattern. This requires three new pieces of electronic mail to be transmitted.

The first is simply created to indicate the new location which modifies the recurrence pattern. This may also, in some PIMs, erase the previous two exceptions. Thus, two new pieces of electronic mail are created to reinstitute the two exceptions (i.e., the cancellation of the April 8$^{th}$ meeting and the time change for the April 15$^{th}$ meeting). These pieces of electronic mail are automatically created by electronic mail application 140. These same actions are taken in response to other suitable modifications as well, such as modification of the list of attendees.

LOCALIZATION

As previously discussed, in the preferred embodiment, a meeting object is typically accompanied by a textual phrase which describes the nature of the meeting request. The textual phrase is generated based upon the property values input by the user during creation of the meeting request. For example, a user may request the potential attendees to attend a meeting on the third Monday of each month at 10:00 a.m., and for a period which extends from Jan. 1, 2000, to Mar. 20, 2001. In that case, a typical text message which might be retrieved and placed in the meeting request object to accompany that object for display to the potential attendees might read as follows:

"This meeting shall take place on the third Monday of each month at 10:00 a.m. beginning Jan. 1, 2000, and ending Mar. 20, 2001."

However, in a different locality, convention may dictate that the day be placed before the month when reciting dates. Further, words or phrases in the text message, and the order of the components of the text message, may need to be rearranged in order to more closely conform to local convention.

In the preferred embodiment, a predetermined text message of the type set out above is generated to describe each different type of recurring meeting which can be requested by the user of mobile device 3.

In accordance with one aspect of the present invention, the text messages used to describe requests for recurring meetings are broken down into a plurality of phrases. Each of the phrases which has been created is broken down into a plurality of fields. The particular phrases which can be created to define a meeting request, and the particular fields into which those phrases are separated can be any suitable phrases and fields.

For the phrase mentioned above, FIG. 11A illustrates one embodiment of the fields into which that phrase can be broken. FIG. 11A shows that a first portion of the phrase "This meeting shall take place on the third Monday of each month" is placed in field 214. The term "at" is placed in field 216. The time designation "10:00" is placed in field 218 and the AM/PM designator is placed in field 220. The term "beginning" is placed in field 222, and the remaining message is similarly broken up into fields 224, 226, 228, 230, 234, 236, 238, 240 and 242.

FIG. 10 is a flow diagram illustrating how the localization process works. The creation of the textual phrases defining meeting requests, and the breaking up of those requests into various predetermined fields, is indicated by block 242. Next, during manufacture of mobile device 3, a localizer program is run on mobile device 3 to rearrange fields 214–240, for each of the messages created, such that the messages conform to local convention. Of course, the specific localizer program which is run on mobile device 3 will depend on the particular locality and consumer base for which mobile device 3 is intended. Once the localizer program has been run, mobile device 3 contains a plurality of sets of fields, referred to as templates, into which message data is placed in order to display the textual message in a localized fashion. Running of the localizer program in setting up the templates is indicated by block 244.

After mobile device 3 has templates which have been localized, mobile device 3 is ready to receive a meeting request and properly display the textual description of the meeting request. When a meeting request is received, the data stream indicative of the textual phrase which describes the meeting is also received by scheduling application program 142. This is indicated by block 246. Scheduling application program 142 parses the incoming data stream into values associated with the various fields in the appropriate template (the appropriate template corresponds to the specific textual description being received) This is indicated by block 248.

Next, the parsed data is placed into preselected fields in the templates based on the created phrases. This is indicated by block 250. Because the localizer program has already been run, the fields in the templates are already placed in appropriate order to conform to local convention.

FIG. 11B illustrates the rearrangement of the fields in the template illustrated in FIG. 11A to conform to a different convention. FIG. 11B illustrates the conformation of the phrase to a convention in which the phrasing is slightly different from that shown in FIG. 11A, and in which the day is conventionally placed prior to the month in a date. The phrase now contains the same terms, but reads:

"Beginning Jan. 1, 2000 and ending Mar. 20, 2001 this meeting shall take place on the third Monday of each month at 10:00 AM."

All appropriate phrases will, of course, be similarly localized.

Also, in an illustrative embodiment, time zone information is handled in an advantageous manner. For instance, when a recurring meeting request is created and sent to a device located in a different time zone, the textual phrase indicative of the recurring meeting includes an indication of the time zone in which the recurring meeting request was created. For instance, if a user in Paris sends a recurring meeting request to a recipient in Seattle (nine hours different) for a meeting occurring every Tuesday at 8:00 a.m. beginning March 3, the textual phrase may be:

"This meeting occurs every Tuesday at 8:00 a.m. beginning March 3; (GMT+1) Paris, Madrid."

This allows the recipient to view the recurrence pattern as originally composed by the sender.

On the other hand, if the meeting is non-recurrent, the time is preferably simply displayed as the appropriate time for the recipient (e.g., "This meeting is scheduled for Tuesday at 11:00 p.m.").

CONCLUSION

Therefore, it can be seen that the present invention provides significant advantages over prior systems. First, the present invention allows the creation of a meeting request from a mobile device itself. The present invention further identifies the object associated with such a meeting request in a manner which uniquely identifies the object to all other devices likely to encounter the object. The present invention also utilizes a feature in the PIMs which indicates whether the meeting request has been sent to potential attendees. These features eliminate duplicate messaging.

The present invention also preferably implements features which reduce the memory required to implement the meeting request feature by use of an abridged address book. Further, the present invention preferably uses a set of scheduling properties which are compatible with a plurality of different PIMs likely to encounter the meeting request. In addition, the present invention preferably utilizes localization procedures which localize meeting requests to more closely conform to local convention and handle time zone information in an advantageous manner. The present invention also preferably supports the use of multiple electronic mail transports as well as a synchronization protocol.

Although the present invention has been described with reference to preferred embodiments, workers skilled in the art will recognize that changes may be made in form and detail without departing from the spirit and scope of the invention.

What is claimed is:

1. A mobile device, comprising:
    an object store;
    an application program configured to maintain objects on the object store;
    a user input mechanism configured to receive user input information;
    a synchronization component configured to synchronize individual objects stored on the object store with remote objects stored on a remote object store;
    a communications component configured to communicate with a remote device containing the remote object store; and
    wherein the application program is further configured to generate a meeting object and an electronic mail scheduling request object based on the user input information.

2. The mobile device of claim 1 wherein the application program is configured to generate the meeting object with a global identifier property uniquely identifying the meeting object among a plurality of other objects.

3. The mobile device of claim 2 wherein the application program is configured to generate the meeting object with a time stamp indicative of a relative time when the meeting object was created and wherein the application program generates the electronic mail scheduling request object with the time stamp.

4. The mobile device of claim 3 wherein the application program comprises:
    a first application program configured to generate the meeting object based on the user input information; and
    a second application program configured to generate the electronic mail meeting request object.

5. The mobile device of claim 1 wherein the application program further comprises:
    a contacts application program configured to maintain objects on the object store indicative of contact information wherein the contact information includes address information indicative of a fully qualified electronic mail addresses for individuals identified by the contact information; and
    wherein the application program is configured to obtain the fully qualified electronic mail address of potential attendees identified by the contact information by interaction with the contacts application program.

6. The mobile device of claim 1 wherein the application program is configured to generate the meeting object and the electronic mail scheduling request object such that properties of the objects are compatible with at least a second application program associated with the remote object store and different from the application program.

7. The mobile device of claim 1 wherein the application program is configured to receive a data stream indicative of a textual phrase describing the meeting object, to parse the data stream into sections and place the sections in corresponding fields of a preselected template containing the fields, the preselected template being associated with the textual phrase received.

8. The mobile device of claim 7 wherein the preselected template is created by arranging the fields in an order, the order being based on a specific locality.

9. A method of operating a mobile device, comprising:
    providing a first object store on the mobile device;
    providing a first application program on the mobile device;
    maintaining objects in the first object store with the first application program;
    intermittently synchronizing the objects in the first object store with objects in a remote object store;
    receiving user input information indicative of a meeting request;
    generating a meeting object with the first application program such that at least some of the user input information defines properties in the meeting object;
    generating an electronic mail meeting request object based on the information in the meeting object; and
    storing the meeting object and the electronic mail scheduling request object in the first object store for transmission.

10. The method of claim 9 wherein synchronizing comprises:
    coupling the mobile device to a computing device having the remote object store;
    synchronizing objects in the first data store with objects in the remote data store; and
    transmitting the electronic mail scheduling request object from an electronic mail transport on the computing device.

11. The method of claim 9 and further comprising:
    providing an electronic mail transport on the mobile device; and
    transmitting the electronic mail scheduling request object through an electronic mail transport on the mobile device.

12. The method of claim 11 wherein providing an electronic mail transport on the mobile device comprises:
    providing a plurality of electronic mail transports on the mobile device; and
    selecting one of the plurality of electronic mail transports through which the electronic mail scheduling request objects are to be transmitted.

13. The method of claim 9 wherein generating a meeting object comprises:
assigning the meeting object a global identifier which uniquely identifies the meeting request relative to other objects.

14. The method of claim 13 wherein generating a meeting object further comprises:
assigning the meeting object a time stamp indication indicating a time when the scheduling object was created; and
wherein generating the electronic mail meeting request object includes assigning the electronic mail meeting request object the time stamp indication.

15. The method of claim 14 and further comprising:
receiving response objects;
correlating the response objects with the meeting object on the mobile device based on the global identifier and the time stamp indication; and
updating a response status associated with the meeting object based on the response objects received.

16. The method of claim 15 and further comprising: synchronizing the response status with the remote object store.

17. A data transmission system, comprising:
a first computing device including:
a first data store configured to store objects;
a user input mechanism; and
a first application program configured to receive user input information from the user input mechanism, create a first object based on the user input information and store the first object on the first data store;
a synchronization manager configured to synchronize objects in the first data store with objects in a second data store;
a second computing device including: the second data store, the second data store being configured to store objects; and
a second application program configured to access the second data store and create an electronic mail scheduling object based on the first object being synchronized to the second data store from the first data store;
an electronic mail transport; and
wherein the second application program is configured to transmit the electronic mail scheduling objects with the electronic mail transport.

18. The system of claim 17 and further comprising:
a third computing device including:
a third data store configured to store objects; and
a third application program configured to access the third data store, to receive electronic mail scheduling objects from the second computing device and to store the electronic mail scheduling objects on the third data store.

19. The system of claim 18 and further comprising:
a fourth computing device including:
a fourth data store; and
a fourth application program configured to access the fourth data store and store objects on the fourth data store; and
wherein the synchronization manager is configured to synchronize objects in the third and fourth data stores.

20. The system of claim 19 wherein the synchronization manager comprises:
a first synchronization manager on at least one of the first and second computing devices; and
a second synchronization manager on at least one of the third and fourth computing devices.

21. The system of claim 17 wherein the first object comprises a meeting object and wherein the electronic mail scheduling object comprises an electronic mail meeting request object.

22. The system of claim 17 wherein the first computing device comprises a mobile device.

23. The system of claim 22 wherein the first application program comprises a scheduling program and wherein the second application program comprises an electronic mail application program.

* * * * *

UNITED STATES PATENT AND TRADEMARK OFFICE
CERTIFICATE OF CORRECTION

PATENT NO. : 6,370,566 B2
DATED : April 9, 2002
INVENTOR(S) : Discolo et al.

It is certified that error appears in the above-identified patent and that said Letters Patent is hereby corrected as shown below:

Title page,
Item [75], Inventors, "Bellevue" should be -- Clinton --

Column 10,
Line 57, "30" should be -- 3 --

Column 11,
Line 13, "Vise" should be -- vice --

Column 15,
Line 31, "S" should be -- 5 --
Line 34, delete "S"

Column 22,
Line 46, "Jan. 1" and "Mar. 20" should be -- 1 Jan. -- and -- 20 Mar. --

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,370,566 B2 Page 1 of 11
APPLICATION NO. : 09/058679
DATED : April 9, 2002
INVENTOR(S) : Discolo et al.

It is certified that error appears in the above-identified patent and that said Letters Patent is hereby corrected as shown below:

Column 23,
Line 32, insert Appendix A as shown on attached pages.

Signed and Sealed this

Twentieth Day of June, 2006

JON W. DUDAS
*Director of the United States Patent and Trademark Office*

APPENDIX A

{autonumlgl } Audience/About this document

This document describes the message properties used by Schedule+ 2.0 to transmit meeting information to another Schedule+ 2.0 user. The document also describes the Schedule+ 1.0 counterpart message properties (where appropriate).

The reader should be familiar with MAPI, specifically properties stored on messages. The reader should also be somewhat familiar with MAPI 0 properties and how Schedule+ 1.0 used them to transmit meeting information.

{autonumlgl } Consumers

This document is intended for third-party developers who plan to interact with Schedule+ 2.0 via email.

{autonumlgl } The Design

Schedule+ 2.0 stores properties of a meeting in similarly typed MAPI properties in a message. Typically, the subject of the message matches the description of the meeting (as it did 1.0), and the body of the message contains the meeting notes (new for 2.0). The addressees of a meeting request or cancellation are compiled from the list of attendees in the meeting, filtered on who should actually receive this mail. The addressee for meeting responses is the meeting originator. Senders and recipients are arranged properly for delegate handling. See the MAPI spec on how to interpret these standard properties.

For mail systems that do not automatically handle delegation of mail, Schedule+ 2.0 will open each addressee's schedule file (or equivalent) to determine if mail should be sent to a delegate instead of or in addition to the intended recipient. Also, Schedule+ 2.0 will determine if the sending user is mailing on behalf of someone else and stamp appropriate properties into the message. The MAPI 1.0 properties which control delegation are PR_SENT_REPRESENTING_(ENTRYID/NAME) and PR_RCVD_REPRESENTING_(ENTRYID/NAME). See the MAPI 1.0 spec on how these properties are set to induce delegation.

Beyond the standard properties, Schedule+ 2.0 defines and uses private properties which have no "normal" messaging counterpart. There are two basic kinds of communication between a meeting organizer and an attendee: some notification related to a single meeting, or some notification related to a recurring meeting. For backward compatability, the recurring notifications are formatted as a superset of single-instance notifications. This way, Schedule+ 1.0 users will at least see a well-formed meeting notification.

As in version 1.0, Schedule+ 2.0 differentiates the type of meeting notification by the mail message class. The class names have changed slightly since 1.0.

| Version 1.0 Class name | Version 2.0 class name | Description |
| --- | --- | --- |
| IPM.Microsoft Schedule.MtgCncl | IPM.Schedule.Meeting.Canceled | Meeting Cancellation notice. From originator |
| IPM.Microsoft Schedule.MtgReq | IPM.Schedule.Meeting.Request | Meeting Request. From originator |

{autonumlgl}   PR_WHERE

A descriptive string describing where the meeting will be held (no 1.0 counterpart). The text of this string will also appear in the body of the note so that non-Schedule+ users will still see some useful information. In 2.0, the embedded body text will be removed before it is displayed or written into the schedule.

{autonumlgl}   PR_GLOBAL_OBJID a "global" ID for the meeting. This ID uniquely and universally ID's the meeting or recurrence pattern. Its internal structure is:

+0 bytes: GUID idenitfying client vendor. For Microsoft Schedule+ 2.0, this GUID is 0x04, 0x82, 0xE0, 0x74, 0xC5, 0xB7, 0x10, 0x1A,
0x82, 0xE0, 0x08, 0x00, 0x2B, 0x36, 0xA3, 0x33

Other vendors should use their own GUID.

+16 bytes: Implementation specific data.

If this property is missing, the attendee tracking features will be disabled. This means further notifications concerning this meeting will not be properly handled by the recipient, and the recipient will not be able to communicate attendee status properly with the originator.

{autonumlgl}   PR_REQUIRED_ATTENDEES

If present, lists all the invited "required" attendees. The string is a concatenated form of the display names of each required attendee, separated by semicolons. The intent is the string itself may be placed in the "To:" well of a mail message when the original meeting request is Replied or Reply-All'ed, and the names will directly resolve into real recipients.

{autonumlgl}   PR_OPTIONAL_ATTENDEES

If present, lists all the invited "optional" attendees. The string is a concatenated form of the display names of each optional attendee, separated by semicolons. The intent is the string itself may be placed in the "CC:" well of a mail message when the original meeting request is Replied or Reply-All'ed, and the names will directly resolve into real recipients.

{autonumlgl}   PR_RESOURCE_ATTENDEES

If present, lists all the invited "resource" attendees. The string is a concatenated form of the display names of each resource attendee, separated by semicolons. The intent is the string itself may be placed in the "BCC:" well of a mail message when the original meeting request is Replied or Reply-All'ed, and the names will directly resolve into real recipients.

{autonumlgl}   PR_PROCESSED

If present and TRUE, indicates that the message's contents have been processed (ie, for responses, the user's response code has been incorporated back into the owner's schedule). This property is not transmitted and is written only by the Schedule+ 2.0 client after the message has successfully been processed.

| IPM.Microsoft Schedule.MtgRespP | IPM.Schedule.Meeting.Resp.Pos | Meeting Acceptance. From attendee. |
|---|---|---|
| IPM.Microsoft Schedule.MtgRespN | IPM.Schedule.Meeting.Resp.Neg | Meeting Declined. From attendee |
| IPM.Microsoft Schedule.MtgRespA | IPM.Schedule.Meeting.Resp.Tent | Meeting Tentatively Accepted. From attendee |

{autonumlgl.} Properties on Single Instance Meetings

The following properties appear on all Schedule+ 2.0 messages and describe a single instance of a meeting. For a recurring meeting requests, the single instance data will be the first instance of the recurrence. For recurrence exceptions, the data will be for that exception.

Some of the following data is optional only in that the notification remains useful even if the data is missing. Data that must be present and valid is marked as so.

{autonumlgl} PR_START_DATE

UTC-adjusted starting date/time of the appointment. Must be present. Uses Schedule+'s method of converting the time from the local timezone into UTC (the NT algorithm is buggy in that it uses the current system time to determine whether or not to consider Daylight adjustments).

{autonumlgl} PR_END_DATE

UTC-adjusted ending date/time of the appointment. Must be present.

{autonumlgl} PR_OWNER_CRITICAL_CHANGE

This is an increasing value based on the time the appoinment date, time, or where data was last modified on the owner's schedule. It is used to insure responses and requests are processed in the correct order (mail receive or send order does not work properly). It is only ever changed by the owner of a meeting. It must be present on all meeting mail.

{autonumlgl} PR_ATTENDEE_CRITICAL_CHANGE

This is an increasing value based on the time of the last response sent by the attendee. It is used to insure responses are processed in the correct order (mail receive or send order does not work properly). It is only ever changed by the invited attendee of a meeting. It must be present on all Meeting Responses.

The idea behind the last two properties is that when a meeting request is sent, it contains in PR_OWNER_CRITICAL_CHANGE the last modification time of the appointment according to the owner's clock. When a recipient reads the reequest, the value in PR_OWNER_CRITICAL_CHANGE is compared against the previous value (from a prior booking) to see if the request is still in date. If it is, the recipient may respond as desired. The response will have a copy of the same value in PR_OWNER_CRITICAL_CHANGE and will stamp the current time in PR_ATTENDEE_CRITICAL_CHANGE (according to the recipient's clock). When the owner reads the response, the PR_OWNER_CRITICAL_CHANGE will be compared against the timestamp stored in the appointment to decide if the response corresponds with this version of the appointment. Then, PR_ATTENDEE_CRITICAL_CHANGE is compared against any prior timestamp for responses received from this user to decide if the response itself is current.

{autonumlgl}    PR_IS_SILENT

If present and TRUE, indicates that the message's contents are intended solely for the Schedule+ 2.0 client. There is no message content of interest for the user. This typically applies to response mail in which the attendee didn't type anything into the message body for the meeting owner to read. Therefore, the mail should be processed and deleted automatically.

{autonumlgl}    PR_WANT_SILENT_RESP

This is used in tandem with PR_RESPONSE_REQUESTED. It is expected that messages from Schedule+ 1.0 will not have this property. Unless this property is present and TRUE, responses will only be sent if PR_RESPONSE_REQUESTED is also present and TRUE. Also, those responses will necessarily be non-silent (ie, the PR_IS_SILENT property in the response will be either missing or FALSE).

{autonumlgl}    PR_DELEGATE_MAIL

If present and TRUE, indicates that the message was sent as part of Schedule+ 2.0's sender-side delegation strategy. If someone receives a piece of mail without this property marked true, but does have someone listed as being a delegate, the mail will automatically be forwarded to that delegate. This scenario can happen if someone sends a piece of mail, and the recipient adds someone as a delegate before the mail is received (but after it has been sent).

{autonumlgl}Properties used with Schedule+ 1.0

The properties listed here need to be translated on the fly to/from the old 1.0 format when the message is converted to/from Mail 3.0 form. This happens by the TNEF converter in MAPI, and shouldn't be the concern of any other developers.

{autonumlgl}    PR_RESPONSE_REQUESTED

If present and TRUE, indicates that the meeting owner has requested that attendees send a response with meaningful text (ie, PR_IS_SILENT is expected to be false). If the property is missing or FALSE, it indicates the sender (owner) is not interested in any response details beyond the actual response code. The recipient (attendee) will not be given the option to write up response mail. However, a response message will be sent and auto-processed by the owner (PR_IS_SILENT will be true). The recipient will be able to override this behavior with a menu option.

{autonumlgl}    PR_OWNER_APPT_ID

A Schedule+ 1.0-spefic form of an appointment ID. Schedule+ 2.0 will write a semi-valid ID here (only in that it probably won't cause problems when communicating with 1.0). Other clients should leave this property blank.

{autonumlgl}Properties on Recurring Meetings

{autonumlgl}    PR_IS_RECURRING

If present and TRUE, indicates that this meeting request contains all the following data.

{autonumlgl}    PR_IS_EXCEPTION

If present and TRUE, indicates that this request is for a single instance of a pattern.

{autonumlgl} PR_SINGLE_INVITE

If present and TRUE, indicates that this request is an invitation to the single instance only. The recipient is not invited to the rest of the pattern.

{autonumlgl} PR_TIME_ZONE

Desribes the owner's time zone (TBD - no work on time zones has been done yet). Must be present for recurring meeting requests.

{autonumlgl} PR_START_RECUR_DATE

The start date of the recurrence pattern in the originator's local time zone. It's encoded by: ((long)ymd.yr * 16l + (long)ymd.mon) * 32l + (long)ymd.day. It's stored as a long so gateways won't interpret the date as if it were in GMT and possibly muck with it. Must be present for recurring meeting requests.

{autonumlgl} PR_START_RECUR_TIME

The start time of the pattern in the originator's local time zone encoded by: ((long)time.hr * 64l + (long)time.min) * 64l + (long)time.sec. Same reason for encoding. Must be present for recurring meeting requests.

{autonumlgl} PR_END_RECUR_DATE

If present, holds the end date for the pattern. If missing, the pattern runs forever. See PR_START_RECUR_DATE for encoding method.

{autonumlgl} PR_END_RECUR_TIME

The end time of the pattern. See PR_START_RECUR_TIME for encoding. Note that unless the first instance of the pattern is an exception, the start date/time and end time for the pattern will coincide with PR_START_DATE and PR_END_DATE in this message. Must be present for recurring meeting requests.

{autonumlgl} PR_DOW_PREF

Describes the 1st day of week user preference. This is for multi-day weekly patterns that have an interval greater than one. Imagine a pattern that's every two weeks on Sunday and Monday starting on the 1st. If the first day of week is Sunday the 1st, the pattern will consist of 1, 2, 15, 16, etc. If the first day of week is Monday, the pattern will be 2, 8, 16, 22, etc. Must be present for recurring meeting requests which describe a weekly pattern where the week interval is greater than 1.

{autonumlgl} PR_RECUR_TYPE

Describes the type of recurrence. One of trecurDaily (0x40), trecurWeekly (0x30), trecurMonthly1 (0x0C), trecurMonthly2 (0x38), trecurYearly1 (0x07), trecurYearly2 (0x33). Must be present for recurring meeting requests.

{autonumlgl} PR_DAY_INTERVAL

Describes the delta in days between instances of this pattern. If missing and required for the pattern type, it is assumed to be 1.

{autonumlgl} PR_WEEK_INTERVAL

Describes the delta in weeks between instances of this pattern. If missing and required for the pattern type, it is assumed to be 1.

{autonumlgl} PR_MONTH_INTERVAL

Describes the delta in months between instances of this pattern. If missing and required for the pattern type, it is assumed to be 1.

Appendix B: Mapping from Schedule+ 1.0 properties

The following table associates the Schedule+ 1.0 message properties to their 2.0 counterparts. All of these properties are defined by MAPI 1.0 for backwards compatibility. Please see the MAPI 1.0 documentation for a description of the PR_SENT_REPRESENTING_* and PR_RCVD_REPRESENTING_* properties.

| Schedule+ 1.0 | Schedule+ 2.0 |
| --- | --- |
| attOwner | if msg is a mtg req or cancellation: PR_SENT_REPRESENTING_(ENTRYID/NAME) otherwise: PR_RCVD_REPRESENTING_(ENTRYID/NAME) |
| attSentFor | only if msg is not a mtg req or cancellation PR_SENT_REPRESENTING_(ENTRYID/NAME) |
| attDelegate | no counterpart |
| attWhen | no counterpart (string recomputed from other data) |
| attAidLocal | no counterpart |
| attDateStart | PR_START_DATE |
| attDateEnd | PR_END_DATE |
| attAidOwner | PR_OWNER_APPT_ID |
| attRequestRes | PR_RESPONSE_REQUESTED |

Appendix C: Schedule+ 1.0 property definitions

```
#define attOwner        FormAtt( iattClientMin+0, atpByte )
#define attSentFor      FormAtt( iattClientMin+1, atpByte )
#define attDelegate     FormAtt( iattClientMin+2, atpByte )
#define attWhen         FormAtt( iattClientMin+4, atpString )
#define attAidLocal     FormAtt( iattClientMin+5, atpLong )
#define attDateStart    FormAtt( iattClientMin+6, atpDate )
#define attDateEnd      FormAtt( iattClientMin+7, atpDate )
#define attAidOwner     FormAtt( iattClientMin+8, atpLong )
#define attRequestRes   FormAtt( iattClientMin+9, atpShort )
```

See the MAPI 0 documentation for the meaning of these macros.

{autonumlgl} PR_YEAR_INTERVAL

Describes the delta in years between instances of this pattern. If missing and required for the pattern type, it is assumed to be 1.

{autonumlgl} PR_DOW_MASK

Bit field (bit 0 = Sunday) which describes which days of the week are valid in this pattern. If missing and required for the pattern type, it is assumed to be $2^8-1$ (all days).

{autonumlgl} PR_DOM_MASK

Bit field (bit 0 = day 1) which describes which days of any given month are valid in this pattern. If missing and required for the pattern type, it is assumed to be $2^{32}-1$ (all days).

{autonumlgl} PR_MOY_MASK

Bit field (bit 0 = January) which describes which months in any given year are valid in this pattern. If missing and required for the pattern type, it is assumed to be $2^{12}-1$ (all months).

Appendix A: Property Definitions

Properties defined by MAPI for S+ backwards compatibility:

PR_START_DATE
PR_END_DATE
PR_RESPONSE_REQUESTED
PR_OWNER_APPT_ID

Non-transmitted properties used by S+:

define PR_PROCESSED            PROP_TAG( PT_BOOLEAN,  0x7d01)

We use named properties for the remaining definitions.

GUID = {0x6FD8DA90, 0x450B, 0x101B, 0x98, 0xDA, 0x00, 0xAA, 0x00, 0x3F, 0x13, 0x05}

| Name | LID | PropType |
| --- | --- | --- |
| ATTENDEE_CRITICAL_CHANGE | 1 | PT_SYSTIME |
| WHERE | 2 | PT_TSTRING |
| GLOBAL_OBJID | 3 | PT_BINARY |
| IS_SILENT | 4 | PT_BOOLEAN |
| IS_RECURRING | 5 | PT_BOOLEAN |
| REQUIRED_ATTENDEES | 6 | PT_TSTRING |
| OPTIONAL_ATTENDEES | 7 | PT_TSTRING |
| RESOURCE_ATTENDEES | 8 | PT_TSTRING |
| DELEGATE_MAIL | 9 | PT_BOOLEAN |
| IS_EXCEPTION | 10 | PT_BOOLEAN |
| SINGLE_INVITE | 11 | PT_BOOLEAN |
| TIME_ZONE | 12 | PT_I4 |
| START_RECUR_DATE | 13 | PT_I4 |
| START_RECUR_TIME | 14 | PT_I4 |
| END_RECUR_DATE | 15 | PT_I4 |
| END_RECUR_TIME | 16 | PT_I4 |
| DAY_INTERVAL | 17 | PT_I2 |
| WEEK_INTERVAL | 18 | PT_I2 |
| MONTH_INTERVAL | 19 | PT_I2 |
| YEAR_INTERVAL | 20 | PT_I2 |
| DOW_MASK | 21 | PT_I4 |
| DOM_MASK | 22 | PT_I4 |
| MOY_MASK | 23 | PT_I4 |
| RECUR_TYPE | 24 | PT_I2 |
| DOW_PREF | 25 | PT_I2 |
| OWNER_CRITICAL_CHANGE | 26 | PT_SYSTIME |

```
/*
 *    S P L U S T A G S . H
 *
 *    Property tag definitions for standard properties of Schedule+ 2.0
 *    objects.
 *
 *    Copyright 1986-1997 Microsoft Corporation. All Rights Reserved.
 */ ifndef SPLUSTAGS_H
define SPLUSTAGS_H define HHPR_START_DATE                             PROP_TAG( PT_SYSTIME,    0x0060)
define HHPR_END_DATE                               PROP_TAG( PT_SYSTIME,    0x0061)
#define HHPR_OWNER_APPT_ID                          PROP_TAG( PT_LONG,       0x0062)
#define HHPR_RESPONSE_REQUESTED                     PROP_TAG( CEVT_I2,       0x0063)

#define HHPR_OWNER_CRITICAL_CHANGE                  PROP_TAG( CEVT_FILETIME, 0x0064)
#define HHPR_ATTENDEE_CRITICAL_CHANGE               PROP_TAG( CEVT_FILETIME, 0x0065)
#define HHPR_WHERE                                  PROP_TAG( CEVT_LPWSTR,   0x0066)
#define HHPR_GLOBAL_OBJID                           PROP_TAG( CEVT_BLOB,     0x0067)
#define HHPR_REQUIRED_ATTENDEES                     PROP_TAG( CEVT_LPWSTR,   0x0068)
#define HHPR_OPTIONAL_ATTENDEES                     PROP_TAG( CEVT_LPWSTR,   0x0069)
#define HHPR_RESOURCE_ATTENDEES                     PROP_TAG( CEVT_LPWSTR,   0x006a)

#define HHPR_IS_SILENT                              PROP_TAG( CEVT_I2,       0x006c)
#define HHPR_WANT_SILENT_RESP                       PROP_TAG( CEVT_I2,       0x006d)
#define HHPR_DELEGATE_MAIL                          PROP_TAG( CEVT_I2,       0x006e)
#define HHPR_IS_RECURRING                           PROP_TAG( CEVT_I2,       0x006f)
#define HHPR_IS_EXCEPTION                           PROP_TAG( CEVT_I2,       0x0070)
#define HHPR_SINGLE_INVITE                          PROP_TAG( CEVT_I2,       0x0071)
#define HHPR_TIME_ZONE                              PROP_TAG( CEVT_I4,       0x0072)
#define HHPR_START_RECUR_DATE                       PROP_TAG( CEVT_I4
```

```
,        0x0073)
#define HHPR_START_RECUR_TIME                           PROP_TAG( CEVT_I4
,        0x0074)
#define HHPR_END_RECUR_DATE                             PROP_TAG( CEVT_I4
,        0x0075)
#define HHPR_END_RECUR_TIME                             PROP_TAG( CEVT_I4
,        0x0076)
#define HHPR_DOW_PREF                                   PROP_TAG( CEVT_I2
,        0x0077)
#define HHPR_RECUR_TYPE                                 PROP_TAG( CEVT_I2
,        0x0078)
#define HHPR_DAY_INTERVAL                               PROP_TAG( CEVT_I2
,        0x0079)
#define HHPR_WEEK_INTERVAL                              PROP_TAG( CEVT_I2
,        0x007a)
#define HHPR_MONTH_INTERVAL                             PROP_TAG( CEVT_I2
,        0x007b)
#define HHPR_YEAR_INTERVAL                              PROP_TAG( CEVT_I2
,        0x007c)
#define HHPR_DOW_MASK                                   PROP_TAG( CEVT_I4
,        0x007d)
#define HHPR_DOM_MASK                                   PROP_TAG( CEVT_I4
,        0x007e)
#define HHPR_MOY_MASK                                   PROP_TAG( CEVT_I4
,        0x007f)

// Non-transmitted property (not named)
#define HHPR_PROCESSED                                  PROP_TAG( CEVT_I2
,   0x7d01)

ifndef HHPR_TAG_ONLY static ULONG SPlusNamedTagTypes[30] = {
    PT_SYSTIME,
    PT_STRING8,
    PT_BINARY,
    PT_BOOLEAN,
    PT_BOOLEAN,
    PT_STRING8,
    PT_STRING8,
    PT_STRING8,
    PT_BOOLEAN,
    PT_BOOLEAN,
    PT_BOOLEAN,
    PT_I4,
    PT_I4,
    PT_I4,
    PT_I4,
    PT_I4,
    PT_I2,
    PT_I2,
    PT_I2,
```

```
        PT_I2,
        PT_I4,
        PT_I4,
        PT_I4,
        PT_I2,
        PT_I2,
        PT_SYSTIME,
        PT_SYSTIME,
        PT_SYSTIME,
        PT_BOOLEAN,
        PT_I4 };

static ULONG SPlusNamedTags[30] = {
    HHPR_ATTENDEE_CRITICAL_CHANGE,
    HHPR_WHERE,
    HHPR_GLOBAL_OBJID,
    HHPR_IS_SILENT,
    HHPR_IS_RECURRING,
    HHPR_REQUIRED_ATTENDEES,
    HHPR_OPTIONAL_ATTENDEES,
    HHPR_RESOURCE_ATTENDEES,
    HHPR_DELEGATE_MAIL,
    HHPR_IS_EXCEPTION,
    HHPR_SINGLE_INVITE,
    HHPR_TIME_ZONE,
    HHPR_START_RECUR_DATE,
    HHPR_START_RECUR_TIME,
    HHPR_END_RECUR_DATE,
    HHPR_END_RECUR_TIME,
    HHPR_DAY_INTERVAL,
    HHPR_WEEK_INTERVAL,
    HHPR_MONTH_INTERVAL,
    HHPR_YEAR_INTERVAL,
    HHPR_DOW_MASK,
    HHPR_DOM_MASK,
    HHPR_MOY_MASK,
    HHPR_RECUR_TYPE,
    HHPR_DOW_PREF,
    HHPR_OWNER_CRITICAL_CHANGE,
    HHPR_START_DATE,
    HHPR_END_DATE,
    HHPR_RESPONSE_REQUESTED,
    HHPR_OWNER_APPT_ID};

endif   // HHPR_TAG_ONLY endif   /* SPLUSTAGS_H */
```